(12) United States Patent
Matthews et al.

(10) Patent No.: US 12,453,484 B2
(45) Date of Patent: Oct. 28, 2025

(54) MATERNAL AND FETAL HEART RATE MONITOR

(71) Applicant: THE REGENTS OF THE UNVIERSITY OF CALIFORNIA, Oakland, CA (US)

(72) Inventors: Dennis Matthews, Meadow Vista, CA (US); Xiaomeng Gao, Dublin, CA (US); Xiaonan Jiang, Davis, CA (US); Xiaoguang Liu, Davis, CA (US); Jeremy Thompson, Grange (AU); Kylie Dunning, Prospect (AU); Kenneth Pawlak, Reno, NV (US); Chris Ryman, Crystal Bay, NV (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 17/343,364

(22) Filed: Jun. 9, 2021

(65) Prior Publication Data

US 2021/0378532 A1   Dec. 9, 2021

Related U.S. Application Data

(60) Provisional application No. 63/036,678, filed on Jun. 9, 2020.

(51) Int. Cl.
*A61B 5/024* (2006.01)
*A01K 29/00* (2006.01)
(Continued)

(52) U.S. Cl.
CPC ........ *A61B 5/02411* (2013.01); *A01K 29/005* (2013.01); *A61B 5/0011* (2013.01);
(Continued)

(58) Field of Classification Search
CPC .............. A61B 5/02411; A61B 5/0011; A61B 5/02438; A61B 5/02444; A61B 5/05;
(Continued)

(56) References Cited

U.S. PATENT DOCUMENTS

| 4,881,549 A | 11/1989 | Rhyne |
| 5,274,271 A | 12/1993 | McEwan |

(Continued)

FOREIGN PATENT DOCUMENTS

| AU | 2015274528 | 1/2017 |
| AU | 2021288685 | 2/2023 |

(Continued)

OTHER PUBLICATIONS

What is an antenna? (Jan. 17, 2017). Amphenol Procom. Retrieved May 31, 2024, from https://amphenolprocom.com/de/?view=article&id=99:what-is-an-antenna&catid=109 (Year: 2017).*

(Continued)

*Primary Examiner* — Christopher Koharski
*Assistant Examiner* — Helene Bor
(74) *Attorney, Agent, or Firm* — O'BANION & RITCHEY LLP; John P. O'Banion

(57) ABSTRACT

Described herein are systems, devices, and methods for non-invasive pregnancy testing. The systems, devices, and methods can be used to provide pregnancy status information of a subject by detecting cardiovascular activity of a fetus in the subject. Subjects can include ruminants, ungulates, and humans.

18 Claims, 16 Drawing Sheets

(51) Int. Cl.
*A61B 5/00* (2006.01)
*A61B 5/05* (2021.01)

(52) U.S. Cl.
CPC ...... *A61B 5/02438* (2013.01); *A61B 5/02444* (2013.01); *A61B 5/05* (2013.01); *A61B 5/6831* (2013.01); *A61B 5/6867* (2013.01); *A61B 2503/40* (2013.01)

(58) Field of Classification Search
CPC . A61B 5/6831; A61B 5/6867; A61B 2503/40; A01K 29/005
See application file for complete search history.

(56) References Cited

U.S. PATENT DOCUMENTS

| | | | |
|---|---|---|---|
| 5,292,348 A | | 3/1994 | Saumarez |
| 5,400,799 A | * | 3/1995 | Yoches ............... A61B 5/6831 600/591 |
| 5,471,993 A | | 12/1995 | Yoches |
| 5,511,553 A | | 4/1996 | Segalowitz |
| 5,573,012 A | * | 11/1996 | McEwan ............... A61B 5/024 600/595 |
| 5,738,102 A | | 4/1998 | Lemelson |
| 5,766,208 A | | 6/1998 | McEwan |
| 5,817,035 A | * | 10/1998 | Sullivan ............. A61B 5/02411 600/588 |
| 6,113,539 A | * | 9/2000 | Ridenour ................. A61B 5/68 128/903 |
| 6,681,404 B1 | | 1/2004 | Adlard |
| 8,068,051 B1 | | 11/2011 | Osterweil |
| 8,378,879 B2 | | 2/2013 | Lewis |
| 8,463,361 B2 | | 6/2013 | Tupin, Jr. |
| 8,494,615 B2 | | 7/2013 | Melamed |
| 8,502,729 B2 | | 8/2013 | Leach, Jr. |
| 8,562,526 B2 | | 10/2013 | Heneghan |
| 9,078,582 B2 | | 7/2015 | Tupin, Jr. et al. |
| 9,870,457 B2 | * | 1/2018 | Lux ...................... A61B 5/02444 |
| 11,116,416 B2 | | 9/2021 | Matthews |
| 11,647,978 B2 | | 5/2023 | Gao |
| 2004/0015087 A1 | | 1/2004 | Boric-Lubecke |
| 2004/0106954 A1 | | 6/2004 | Whitehurst |
| 2005/0052322 A1 | | 3/2005 | Park |
| 2005/0073424 A1 | | 4/2005 | Ruoss |
| 2005/0100376 A1 | | 5/2005 | Omotani |
| 2006/0094937 A1 | | 5/2006 | Immoreev |
| 2006/0247506 A1 | | 11/2006 | Balberg |
| 2006/0253007 A1 | | 11/2006 | Cheng |
| 2007/0167704 A1 | | 7/2007 | Chance |
| 2008/0074307 A1 | | 3/2008 | Boric-Lubecke |
| 2008/0294019 A1 | | 11/2008 | Tran |
| 2009/0048500 A1 | | 2/2009 | Corn |
| 2009/0203972 A1 | | 8/2009 | Heneghan |
| 2009/0227882 A1 | | 9/2009 | Foo |
| 2009/0278728 A1 | | 11/2009 | Morgan |
| 2010/0036277 A1 | * | 2/2010 | Austin .................... G01K 1/024 600/595 |
| 2010/0056907 A1 | | 3/2010 | Rappaport |
| 2010/0113945 A1 | | 5/2010 | Ryan |
| 2010/0152600 A1 | | 6/2010 | Droitcour |
| 2010/0168596 A1 | | 7/2010 | Jaeschke |
| 2010/0179438 A1 | | 7/2010 | Heneghan |
| 2010/0245091 A1 | | 9/2010 | Singh |
| 2010/0274145 A1 | | 10/2010 | Tupin, Jr. |
| 2011/0060215 A1 | | 3/2011 | Tupin, Jr. |
| 2011/0218586 A1 | | 9/2011 | Li |
| 2012/0184830 A1 | * | 7/2012 | Balberg ............... G01S 15/8968 600/407 |
| 2013/0053653 A1 | | 2/2013 | Cuddihy |
| 2013/0135137 A1 | | 5/2013 | Mulder |
| 2013/0245436 A1 | | 9/2013 | Tupin, Jr. |
| 2013/0281800 A1 | | 10/2013 | Saroka |
| 2015/0182322 A1 | * | 7/2015 | Couse ..................... G01K 1/20 119/858 |
| 2015/0359463 A1 | | 12/2015 | Matthews et al. |
| 2016/0256132 A1 | | 9/2016 | Van De Laar |
| 2016/0270670 A1 | * | 9/2016 | Oz ........................... A61B 5/352 |
| 2017/0281087 A1 | | 10/2017 | Workman |
| 2018/0192951 A1 | | 7/2018 | Amir |
| 2018/0317878 A1 | * | 11/2018 | Wohlschlager .......... A61B 8/02 |
| 2020/0289047 A1 | * | 9/2020 | Qi ......................... A61B 5/7278 |
| 2021/0212657 A1 | | 7/2021 | Gao et al. |
| 2022/0031187 A1 | | 2/2022 | Matthews |

FOREIGN PATENT DOCUMENTS

| | | | |
|---|---|---|---|
| CN | 202669497 U | 1/2013 | |
| CN | 104968392 A | 10/2015 | |
| CN | 115103627 A | 9/2022 | |
| EP | 2368492 A1 | 9/2011 | |
| EP | 3154423 | 4/2017 | |
| EP | 4064976 A1 | 10/2022 | |
| EP | 4161385 | 4/2023 | |
| JP | 2002538872 A | * 1/2002 | ......... A61B 5/02405 |
| WO | 2004109316 A2 | 12/2004 | |
| WO | 2007052108 A3 | 5/2007 | |
| WO | 2007124126 A2 | 11/2007 | |
| WO | 2007143535 A2 | 12/2007 | |
| WO | 2008026157 A2 | 3/2008 | |
| WO | 2008057883 A2 | 5/2008 | |
| WO | 2008148040 A1 | 12/2008 | |
| WO | 2009031149 A2 | 3/2009 | |
| WO | 2011146517 A2 | 11/2011 | |
| WO | 2012148280 A1 | 11/2012 | |
| WO | 2013118121 | 8/2013 | |
| WO | 2015191905 A1 | 12/2015 | |
| WO | WO2015191905 A | 12/2015 | |
| WO | 2017162686 | 9/2017 | |
| WO | 2018144968 A1 | 8/2018 | |
| WO | 2019160645 | 8/2019 | |
| WO | WO2021108357 A1 | 6/2021 | |
| WO | 2021252660 | 12/2021 | |

OTHER PUBLICATIONS

Gunn et al., Pregnancy Testing in Beef Cattle, BUL 913, Published Nov. 2018.
Pohler et al., Past, present and future of pregnancy detection methods, Applied Reproductive Strategies in Beef Cattle, Sep. 2016.
Pratiwi, A. Asmi, et al., "Ultra Wide Band (UWB) Antenna Design for Fetal Monitoring", 2014 Makassar International Conference on Electrical Engineering and Informatics (MICEEI), Nov. 26-30, 2014, pp. 1-4.
European Patent Office (EPO), Communication (Extended European Search Report) issued Jun. 3, 2024, related European patent application No. 21821432.8, pp. 1-9, with claims searched, 10-12.
ISA/US, United States Patent and Trademark Office (USPTO), International Search Report and Written Opinion issued Sep. 27, 2021, related PCT international application No. PCT/US2021/036656, pp. 1-12, with claims searched, pp. 13-19.
Aardal, et al., "Detecting Changes in the Human Heartbeat With On-Body Radar", 2013 IEEE Radar Conference (RadarCon13), 2013, pp. 1-6. doi:10.1109/RADAR.2013.6586027.
Office Action issued in Canadian Application No. 2,951,722 on Mar. 28, 2022.
Office Action issued in European Patent Application No. 15806524.3 on Mar. 29, 2022.
U.S. Appl. No. 14/736,745 Office Action dated Sep. 20, 2017.
Examination Report dated Aug. 20, 2019, for Australian Application No. 2015-274538.
U.S. Appl. No. 14/736,745 Office Action dated Jun. 30, 2017.
U.S. Appl. No. 14/736,745 Office Action dated Dec. 28, 2016.
U.S. Appl. No. 14/736,745 Office Action dated Apr. 6, 2018.
Zito, Domenico et al. "Feasibility Study and Design of a Wearable System-on-a-Chip Pulse Radar for Contactless Cardiopulmonary Monitoring", International Journal of Telemedicine and Applications, vol. 2008, Article ID 328597, 10 pages, 2008.
Office Action issued in Canadian Patent Application No. 2,951,722 on Jun. 23, 2021.

(56) References Cited

OTHER PUBLICATIONS

Brovoll, et al., "Optimal frequency range for medical radar measurements of human heartbeats using body-contact radar", 35th Annual international conference of the IEEE Engineering in Medicine and Biology Society (EMBC), Osaka, pp. 1752-1755, 2013.
Azevedo, et al., "Micropower impulse radar", Science and Technology Review, 1996, pp. 16-29.
European Search Report and Search Opinion dated Jan. 8, 2018, for European Application No. EP15806524.3.
Fletcher, Richard Ribon et al., "Wearable Doppler Radar with Integrated Antenna for Patient Vital Sign Monitoring", RSW, 2010, pp. 276-279.
Office Action dated Jun. 4, 2019, for Japanese Application No. 2017-517214.
First Examination Report issued in Indian Patent Application No. 201717000278 dated Oct. 29, 2020.
International Search Report and Written Opinion dated Nov. 4, 2015, for PCT Application No. US2015/0345405.
Canadian Intellectual Property Office, Office Action dated Nov. 29, 2023, related Canadian application No. 2,951,722 , pp. 1-6, with claims examined, pp. 7-12.
Aardal, Oyvind et al., "Detecting changes in the human heartbeat with on-body radar," 2013 IEEE Radar Conference (RadarCon13), Ottawa, ON, Canada, 2013, pp. 1-6.
Ellingson, Steven W., "10.1: How Antennas Radiate", Chapter 10: Antennas, p. 10.1.1., Libre Text, 45 pages, Jan. 2020, downloaded from https://phys.libretexts.org/@go/page/24841; original source https://doi.org/10.21061/electromagnetics-vol-2.
Park, Jae-Hyun et al., "915-MHz Continuous-Wave Doppler Radar Sensor for Detection of Vital Signs", Electronics 2019, 8, 561; doi:10.3390/electronics8050561, published May 20, 2019.
Cheung, Yiu-fai, "The role of 3D wall motion tracking in heart failure", Nature reviews Cardiology, vol. 9, 2012, pp. 644-657.
Guazzi, Marco et al., "Pulmonary Hypertension in Heart Failure: Pathophysiology, Pathobiology, and Emerging Clinical Perspectives", Journal of the American College of Cardiology, vol. 69, Issue 13, pp. 1718-1734, 2017.
Mazimba, Sula et al., "Pulmonary Artery Proportional Pulse Pressure (PAPP) Index Identifies Patients with Improved Survival From the CardioMEMS Implantable Pulmonary Artery Pressure Monitor", Heart Lung Circ. 30(9), Sep. 2021, pp. 1389-1396.
Simon, Marc A. et al., "Phenotyping the right ventricle in patients with pulmonary hypertension", Clinical Translation Science, vol. 2, Issue 4, Aug. 2009, pp. 294-299.
Haddad, Francois et al., "Right Ventricular Function in Cardiovascular Disease, Part I" Anatomy, Physiology, Aging, and Functional Assessment of the Right Ventricle, Circulation, vol. 117, Issue 11, Mar. 18, 2008, pp. 1436-1448.
International Search Report and written opinion dated Mar. 25, 2021, for PCT Application No. PCT/US2020/061931.
International Search Report and written opinion dated Nov. 4, 2015, for PCT Application No. PCT/US2015/035405.
Wharton, Christopher F. P. et al. "Changes in left ventricular wall movement after acute myocardial infarction measured by reflected ultrasound", British Medical Journal, 4(5779), Octoer 9, 1971, pp. 75-77.
Nagueh, Sherif F. et al. "Echocardiographic Evaluation of Hemodynamics in Patients with Decompensated Systolic Heart Failure", Circulation: Cardiovascular Imaging, 4, 2011, pp. 220-227.
Matos, J. Novo et al. "Transient Myocardial Thickening in Cats Associated with Heart Failure", Journal of Veterinary Internal Medicine, 32(1), 2017, pp. 48-56.
Robbins, et al., "Prevalence and severity of mitral regurgitation in chronic systolic heart failure", 91(3), Feb. 2003, pp. 360-362.
Tidholm, et al., "Tissue Doppler and Strain Imaging in Dogs with Myxomatous Mitral Valve Disease in Different Stages of Congestive Heart Failure", J Vet Intern Med, 23(6), 2009, pp. 1197-1207.
Heart Failure—Symptoms and causes—Mayo Clinic; https://www.mayoclinic.org/diseases-conditions/heart-failures/symptom-causes/syc-20373142, 2021.
European Patent Office (EPO), Communication (Extended European Search Report) issued Mar. 18, 2024, related European patent application No. 20892720.2, pp. 1-11, claims searched, pp. 12-12.
Shen, Chen et al., "Anisotropic Complementary Acoustic Metamaterial for Canceling out Aberrating Layers", American Physical Society, Physical Review X 4, 041033 (2014), pp. 041033-1 to 041033-7.

\* cited by examiner

FIG. 11

MATERNAL AND FETAL HEART RATE MONITOR

CROSS-REFERENCE

This application claims the benefit of U.S. Provisional Application No. 63/036,678, filed Jun. 9, 2020, which is incorporated by reference herein in its entirety.

STATEMENT REGARDING FEDERALLY SPONSORED RESEARCH OR DEVELOPMENT

The invention was made with the support of the United States government under the Small Business Technology Transfer Award #1660253 by the National Science Foundation. The government may have certain rights in the invention.

BACKGROUND

Reproductive efficiency can be a major concern for livestock producers due to the significant economic impact on livestock operation. Determining pregnancy status early on is an important factor in determining reproductive efficiency. Early identification of open (non-pregnant) females can provide a better evaluation of conception rate, efficacy of an artificial insemination program, and possible underlying disease. Females identified as open can be rebred or inseminated, thereby providing an economic advantage to the producer. Early identification of pregnant females can provide an estimated calving date and identification of multiple fetuses. Pregnancy status information of an animal can be invaluable in making management decisions regarding nutrition and herd health, such as adjusting nutrition to provide for fetal demands, and administration of vaccines to prevent abortion and ensure passive transfer of immunity. An ideal pregnancy test is one that is simple to perform, safe, non-invasive, inexpensive, and can determine pregnancy status with a high degree of accuracy early after mating.

SUMMARY

In some embodiments, the invention provides a device comprising: a) a transmitter configured to transmit electromagnetic waves to a heart of a fetus in a subject; and b) a fetal sensor configured to detect signals reflected from the heart in response to the electromagnetic waves transmitted to the heart by the transmitter, wherein the transmitter is configured to transmit the electromagnetic waves by a distance of at least 10 cm to the heart of the fetus.

In some embodiments, the invention provides a method comprising: a) transmitting through skin of a subject by a transmitter electromagnetic waves to a heart of a fetus inside the subject; and b) detecting by a fetal sensor a signal reflected from the heart of the fetus in response to the electromagnetic waves transmitted to the heart of the fetus, wherein the heart of the fetus is disposed at a depth of at least 10 cm beneath the skin of the subject.

In some embodiments, the invention provides a method comprising: a) transmitting through a rectal wall of a subject by a transmitter electromagnetic waves to a heart of a fetus inside the subject; and b) detecting by a fetal sensor a signal reflected from the heart of the fetus in response to the electromagnetic waves transmitted to the heart of the fetus, wherein the heart of the fetus is disposed at a depth of at least 2 cm beneath the rectal wall of the subject.

INCORPORATION BY REFERENCE

Each patent, publication, and non-patent literature cited in the application is hereby incorporated by reference in its entirety as if each was incorporated by reference individually.

BRIEF DESCRIPTION OF THE DRAWINGS

FIG. 11 illustrates motion resolution test results of the three simulations of FIG. 10.

DETAILED DESCRIPTION

Figure 1:
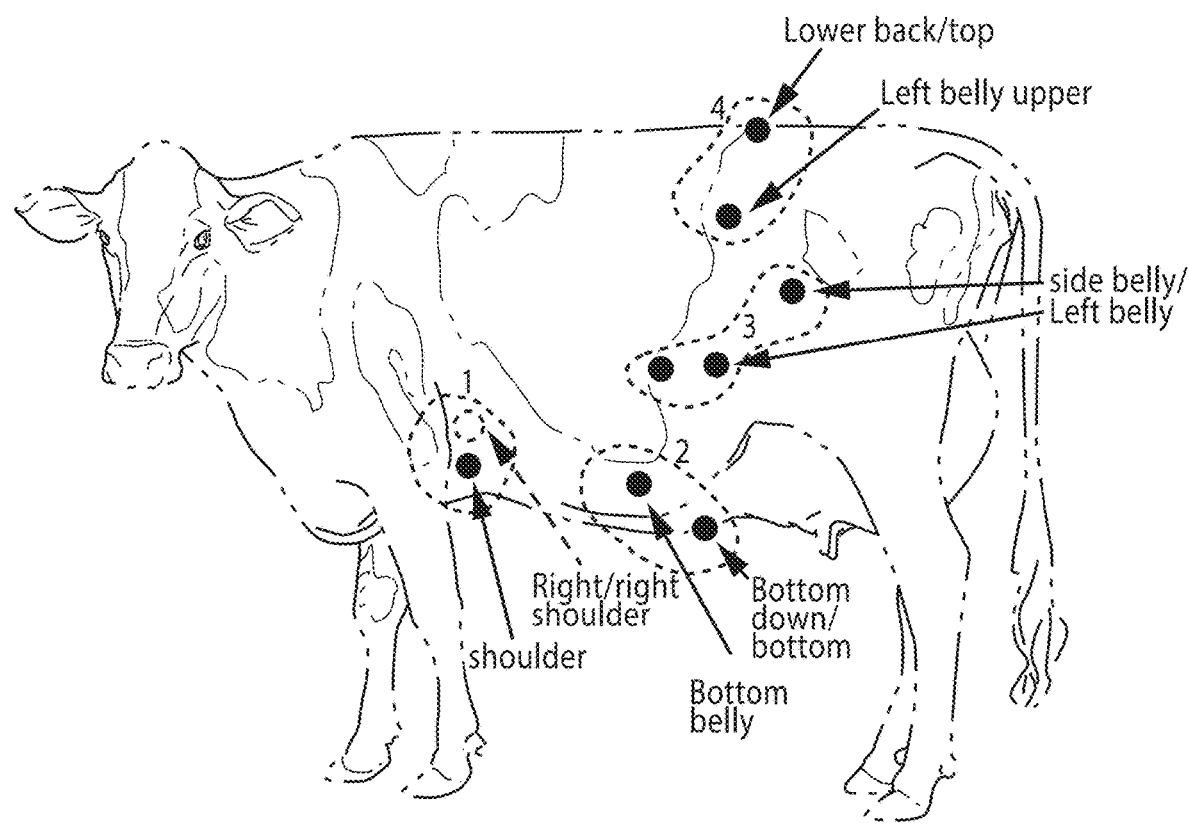
FIG. 1 illustrates various locations in which a fetal heart monitoring device described herein can be positioned on a subject, for example, a cow.

Pregnancy testing of animals is a critical method of monitoring reproductive efficiency and detecting any health problems early in the breeding cycle. In many cases, cattle pregnancy is determined by blood test. However, pregnancy blood tests require a wait time (e.g., 2-3 days) and are expensive. Rectal palpation is an inexpensive and convenient method of pregnancy testing cattle. However, manual testing via rectal palpation requires skilled veterinarian labor costs, bears a risk of injury to the animal, and cannot be used to detect early pregnancies. In some cases, rectal palpation poses a risk for spread of disease among animals, particularly when hygienic practices are not followed. The palpation method can normally be performed as early as 35 days of gestation, but with limited accuracy. Early pregnancy detection can be critical for making business decisions, for example, whether to cull for abattoir/slaughterhouse an animal suspected of being pregnant. Further, rectal palpation often cannot accurately detect the presence of multiple fetuses. Improper detection of multiple fetuses can derail reproductive management strategies, further inflating costs.

Ultrasound imaging is another approach of pregnancy testing, which can be performed by a veterinarian from about 30-35 days of gestation, although accuracy may not be reliable until about 35-40 days of gestation. Ultrasound imaging can provide more information than palpation does, such as visibility of the fetus, multiple fetus detection, and fetal sex detection (between about 55-90 days of gestation). Ultrasound imaging can be performed by probing within an animal's rectum, and can be less stressful than the palpation method is to the cow. However, the high equipment and labor/skills costs required for this technique limits the utility.

Described herein are fetal and maternal heart monitoring devices and systems, and methods of use thereof. The devices and systems can be used to monitor a fetal and/or the maternal heart rate of a pregnant subject to determine pregnancy status, particularly early pregnancy status. Devices described herein can be used to monitor a fetal heart rate in a pregnant subject at various time points, for example, within 28 days of gestation and the time of birth. In addition, the sensor may also provide simultaneous monitoring of multiple indicators of maternal health, such as maternal heart rate, maternal respiration, maternal posture, maternal heart rate variability, and other derivative parameters and trends during pregnancy.

Devices described herein allow for non-invasive detection of fetal and maternal physiological data using a single sensor. In some embodiments, devices described herein include more than one sensor. In the multiple sensors setting, devices can be embedded in blanket, harness, or sheet. Multi-sensor devices can generate high-resolution readings of fetal heart rate, and identify multiple fetuses, for example, a twin or triplet pregnancy.

In some embodiments, devices described herein include a rectal sensor probe having a radar sensor embedded at the tip of the probe. The radar sensor allows for rectal monitoring of a health status of a fetus in a pregnant subject.

Non-limiting examples of subjects include animals, domesticated animals, non-human animals, livestock, ruminants, ungulates, bovines, equines, zoo animals, dairy cows, beef cows, cattle, bison, buffalo, yaks, horses, pigs, sheep, goats, cats, dogs, monkeys, whales, dolphins, and humans.

Doppler radar sensing is widely used for speed sensing, weather forecasting, and other applications for precision motion sensing. Doppler radar sensing also has utility in biomedical applications to acquire vital signs in a non-contact fashion. For example, the modulated phase shift associated to periodic cardiopulmonary motions reflected on the surface of a subject's chest can be processed to yield physiological information from the subject, such as heart rate, heart rhythm, respiratory rate, tidal volume, pulse transit time, and cardiopulmonary motion amplitude. However, microwave Doppler radar vital sign sensing based on reflections arising from the chest surface only indirectly monitors cardiopulmonary motions. Signals arising from chest surface motions are induced by periodically pounding of the heart in the inner chest or by ribcage expansion and contraction as a result of respiration. Microwave signals used to probe these signals are largely reflected off the surface of the chest wall and only a very small portion reach the heart. Thus, methods of directly monitoring the heart, for example, by detecting reflections arising from the surface of the heart itself, would be more useful and more sensitive for determining spatial changes of the heart.

Devices described herein can include a continuous wave (CW) Doppler radar sensor adapted in an in-contact or non-contact configuration to a subject. In some embodiments, devices described herein include a body-coupled probe coupled to a Doppler radar transceiver, which transmits radio wave signals into the chest cavity and onto the surface of the heart wall of a subject. The mechanical contraction and expansion of the heart muscle creates a Doppler shift due to the Doppler effect. Thus, upon transmission of electromagnetic radiation to the heart, the motion of the heart wall can be modulated into a reflected signal.

FIG. 1 illustrates various locations in which a fetal heart monitoring device described herein can be positioned on a pregnant subject, for example, a cow. Dark gray circles denote the fore (left) side and light gray circles denote the hind (right) side of the cow. Non-limiting examples of sensor locations include the shoulder, the left shoulder, the right shoulder, the belly, the bottom belly, the side belly, the left belly, the right belly, the lower back, the left upper belly, and the right upper belly of a subject.

A device described herein can be, or cannot be, in contact with a subject's skin. The device can be placed in proximity to, for example, the heart or thoracic cavity of a subject. The device can be placed directly on, for example, the chest, sternum, or thoracic cavity of a subject. The device can be placed in proximity to the uterus, uterine cavity, or uterine horns of the subject. In some embodiments, the device can be placed on a shoulder, the left shoulder, the right shoulder, a belly, the bottom belly, the side belly, the left belly, the right belly, the lower back, the left lower back, the right lower back, the left upper belly, and the right upper belly of a subject, as viewed from the rear of the subject. In some embodiments, the device is placed in contact with a subject's skin such that the transmission of electromagnetic waves (e.g., via a radar beam) is directed to the uterine cavity of the subject.

A device described herein can be inserted into a subject's rectum. Such transrectal devices can be used to detect fetal heart motion by transmitting radar signals through the rectal wall to the uterine cavity of the subject.

Figure 2:
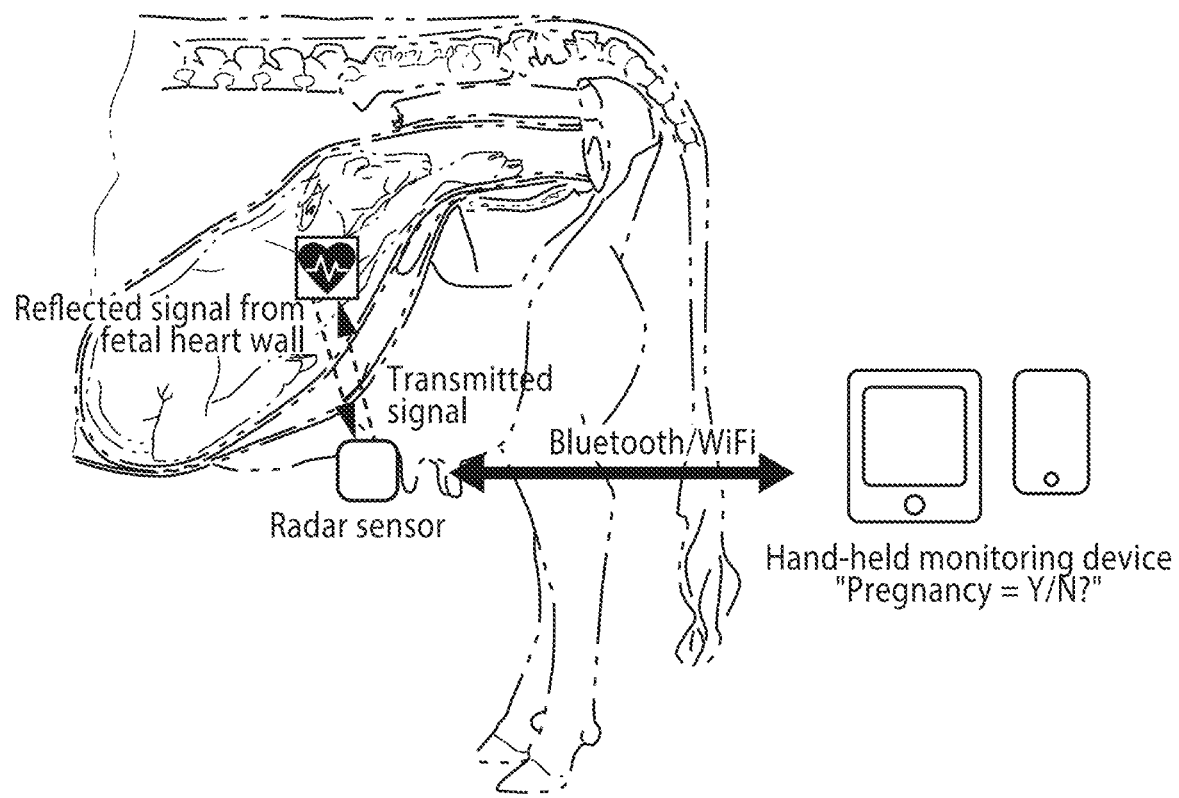
FIG. 2 illustrates a schematic of a fetal heart monitoring device described herein.

FIG. 2 illustrates a schematic of a fetal heart monitoring device described herein. A radar sensor can be positioned at the lower belly of a cow. The device can transmit radar signals from the sensor to the heart wall of the fetus and receive signals from the heart wall based on fetal heart motions. Reflected signals received from the fetal heart can be transmitted to a remote device by wireless communications, e.g. Bluetooth® or Wi-Fi. The reflected signals can be used to determine the pregnancy status of the subject, as well as pregnancy stage of the subject.

Figure 3:
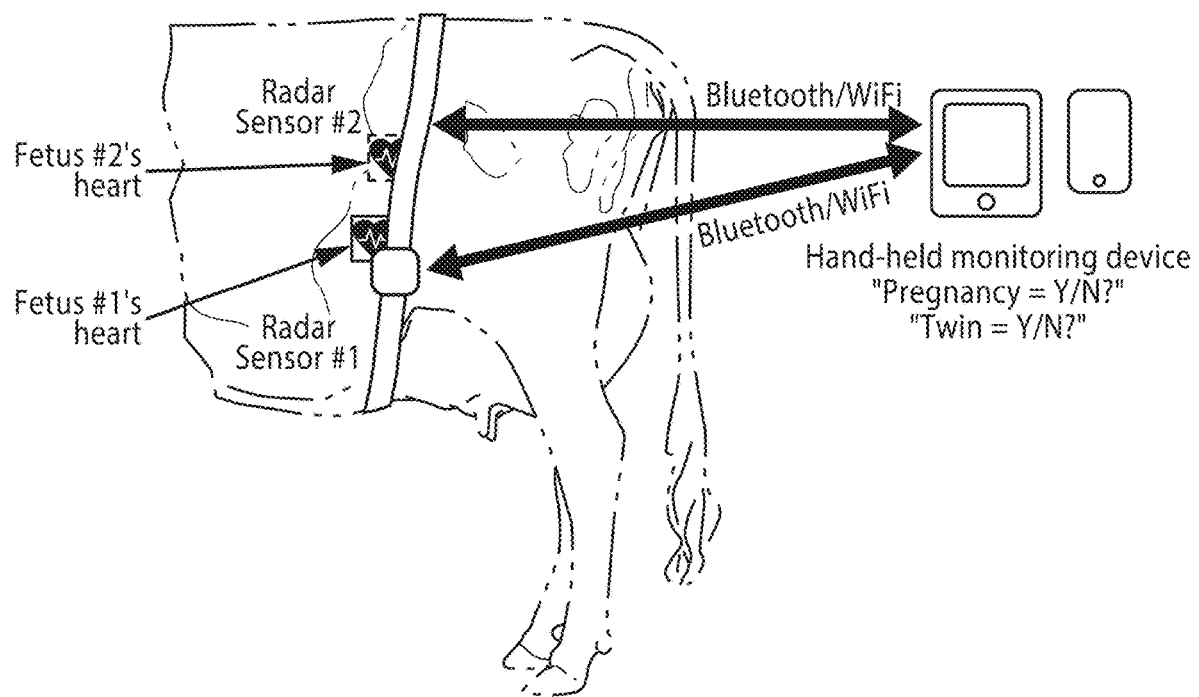
FIG. 3 illustrates a schematic of a heart monitoring device described herein.

FIG. 3 illustrates a schematic of a heart monitoring device described herein containing multiple sensors attached to the cow. In this example, two sensors are attached to a harness, which is strapped around the hip of the cow above the mammary gland. One sensor (Radar sensor #1) is positioned at the lower left belly and the second sensor (Radar sensor #2) is positioned at the upper left belly. Signals received by the two sensors allow for detection of multiple fetal heart rates, thereby allowing for detection of multiple fetuses. Reflected signals received from the fetal heart(s) can be transmitted to a remote device by wireless communications, e.g. Bluetooth® or WiFi®.

Figure 4:
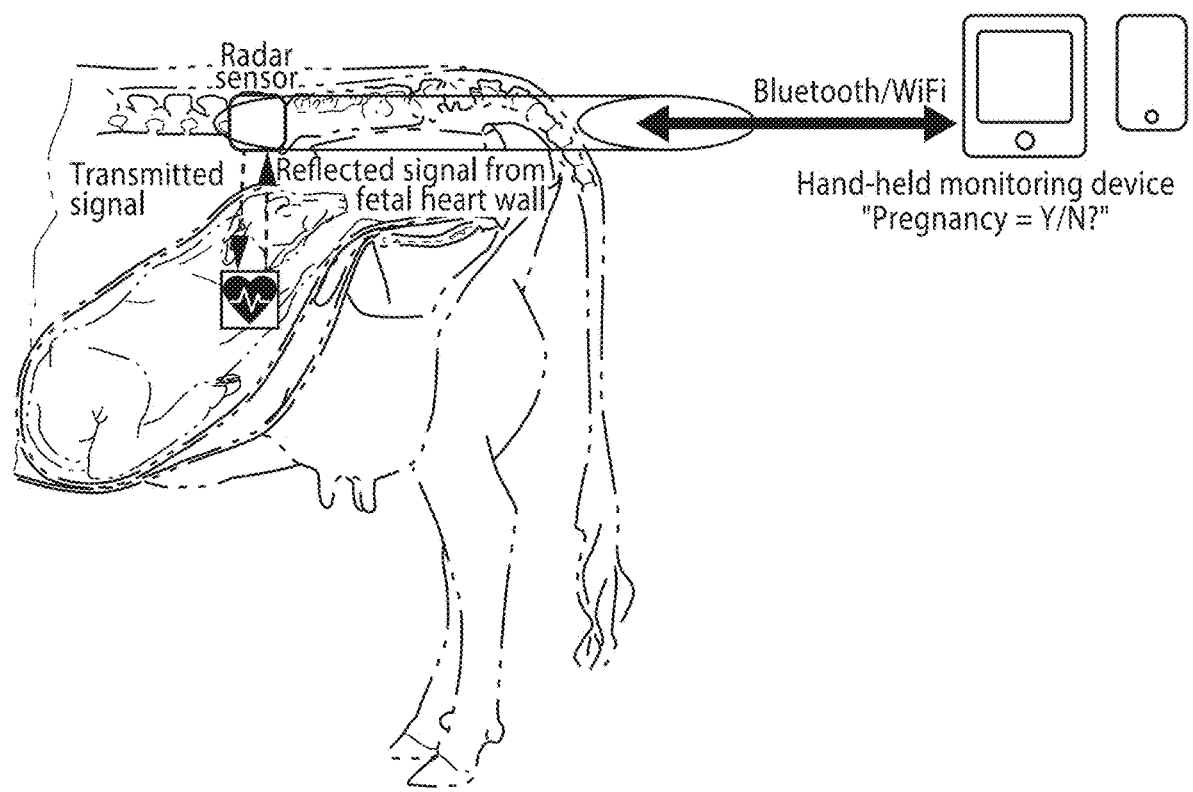
FIG. 4 illustrates a schematic a transrectal fetal heart monitoring device described herein.

FIG. 4 illustrates a schematic a transrectal fetal heart monitoring device described herein. A radar sensor is embedded at the tip of the probe. The radar sensor can transmit signals from the rectum downward towards the fetus and receive reflected signals from the surface of the fetal heart wall. Reflected signals can be transmitted to a remote device by wireless communications, e.g. Bluetooth® or Wi-Fi®.

Figure 5:
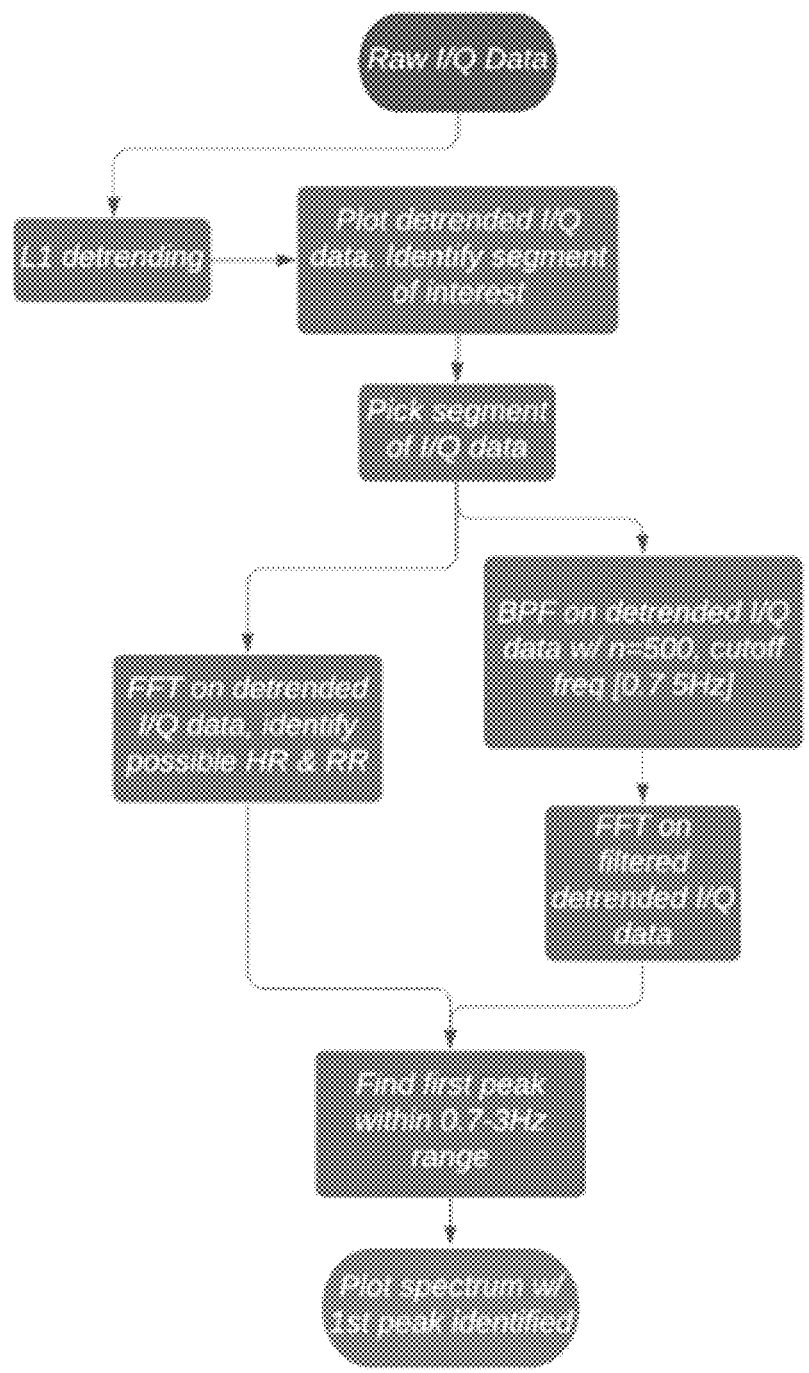
FIG. 5 illustrates a schematic of the signal processing flow of a fetal heart monitoring device described herein.

FIG. 5 illustrates a schematic of the signal processing flow of a device described herein. Reflected radar signals received by the device from the heart can be received as raw in-phase and quadrature (I/Q) data (Raw I/Q Data). The raw data can be processed by linear detrending (L1 detrending) to generate a plot that allows for identification of an I/Q data segment of interest. A selected I/Q data segment can be further processed by fast Fourier transform (FFT) to determine a possible fetal heart rate (HR) or respiratory rate (RR). A selected I/Q data segment can also be processed by bandpass-filtering (BPF) prior to FFT computation. Bandpass-filtering can be performed, for example, using cutoff parameters of n=500 and cutoff frequency of 0.75 Hz. The fast Fourier transform computation can be used to identify a first peak, for example, within the frequency range of 0.7-3 Hz. The first peak can then be used to plot a spectrum. Multiple iterations of this process allow for identification of multiple peaks that can be used to generate a comprehensive plot for determining fetal heart rate.

Fetal Heart Monitoring Device

Devices described herein can be used to determine, observe, record, time, track, or calculate the duration or frequency of, a heartbeat of a fetus in a subject or a heartbeat of a pregnant subject.

A detection system of the invention can comprise a transmitter, a receiver, and an antenna. The transmitter can generate a signal that is radiated into a space containing an object of interest by the antenna. The signal can then be reflected off the object of interest, and a reflected signal can be detected by the receiver. The receiver can amplify the signal for conversion to, for example, visual or audio data.

Figure 6:
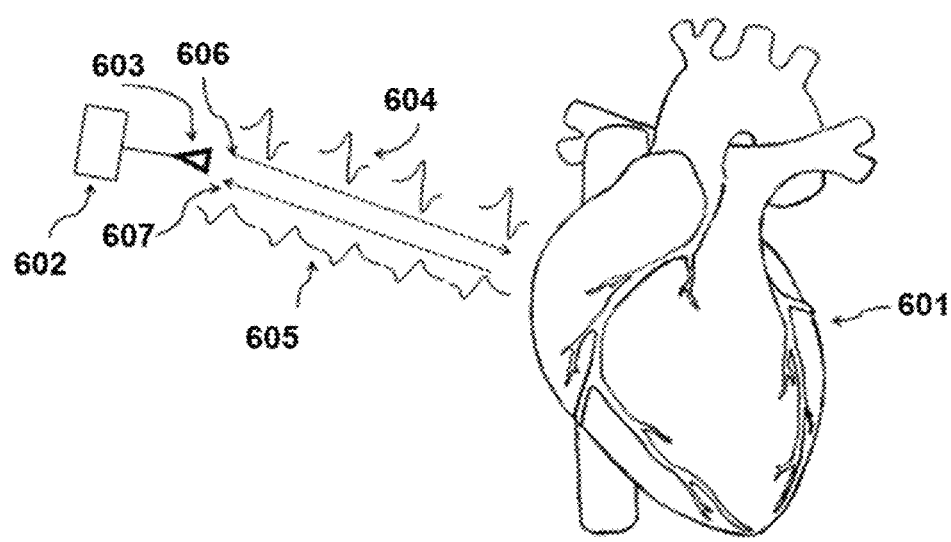
FIG. 6 depicts a fetal heart monitoring device described herein.

FIG. 6 depicts an example fetal heart monitoring device described herein. The device 602 can comprise an antenna 603 and be positioned in proximity to, for example, a maternal heart or fetal heart 601. The antenna can transmit 606 a signal 604 to the heart. The signal 604 can reflect off, for example, the muscle tissue of the heart or the exterior wall of the heart. The reflected signal 605 can then be received 607 by the device 602 and processed for analysis.

Figure 7:
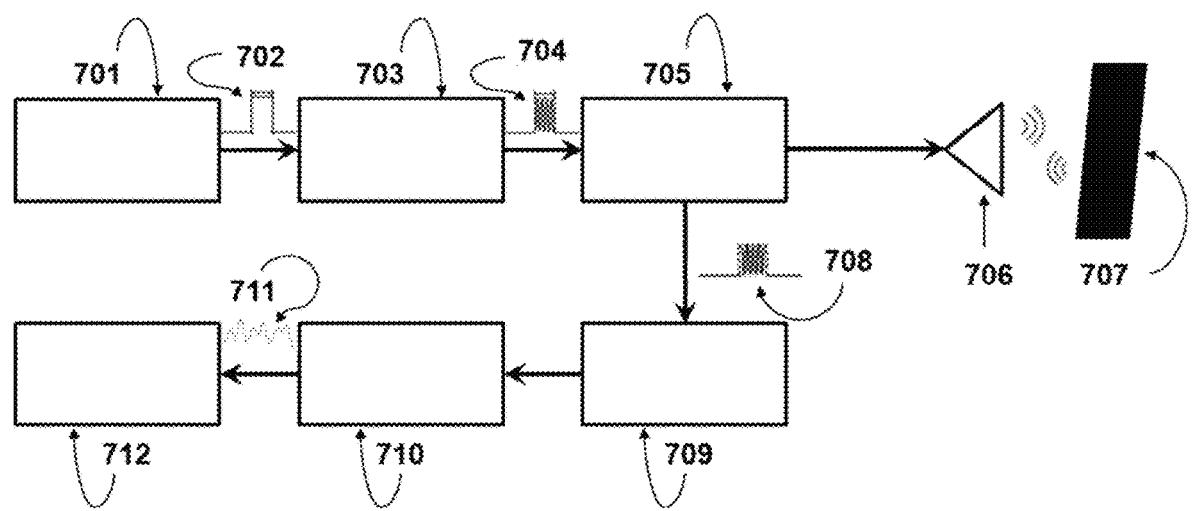
FIG. 7 illustrates an embodiment of a device described herein used to determine a fetal heart rate in a pregnant subject.

FIG. 7 illustrates an embodiment of a device described herein used to determine a heart rate in a subject. The pulse generator 701 generates a pulse 702 that is routed through a pulsed sine wave generator 703 to generate a pulse waveform 704. The pulse waveform 704 is then routed to the antenna 706 via the duplexer 705. The pulse waveform 704 can then propagate from the antenna 706 to a target 707, such as a heart of portion thereof. In some embodiments, the pulse waveform 704 is electromagnetic radiation such as a radio wave, an electromagnetic signal, a wavelength or frequency of the electromagnetic spectrum, a wavelength of light, or a photon. After transmission of the pulse waveform 704, the pulse waveform 704 can be reflected off the target 707, such as the heart. The pulse waveform 704 is detected by the antenna 706 and routed to the mixer 709 via the duplexer 705, which converts the detected pulse waveform into a duplexed waveform 708. The duplexed waveform 708 is propagated from the mixer 709 to the amplifier and filters 710 to generate the filtered waveform 711. The filtered waveform 711 is then propagated to the signal processing and display unit 712. In some embodiments, the device comprises a radar system. Non-limiting examples of the types of radar that can be used in the device include ultrawide bandwidth radar, CW Doppler radar, pulsed Doppler radar, frequency-modulated CW radar, and pseudorandom code modulated CW radar.

Signals Suitable for Use

Ultrasound involves the use of high frequency sound waves outside the range of human hearing to create images of, for example, organs and systems within the human body. Medical sonography is the practice of imaging organs within the body. Ultrasound images (sonograms) are made by sending a pulse of ultrasound into tissue using an ultrasound transducer. The sound reflects and echoes off parts of the tissue and this echo is recorded and displayed as an image to the operator.

The electromagnetic (EM) spectrum is a continuum of all the possible frequencies of electromagnetic radiation. Electromagnetic radiation can be described by physical properties including frequency, wavelength, and energy. The different regions of the EM spectrum, in decreasing order of wavelength and increasing order of frequency, include radio waves, microwaves, far infrared, near infrared, visible, ultraviolet, X-rays, gamma rays, and high-energy gamma rays.

Radio waves are generally propagated via the use of an antenna and can have wavelengths that range from hundreds of kilometers to a millimeter. Radio waves can be used for communication satellites, navigation systems, radio communication, broadcasting, and radar.

Microwaves have wavelengths that range from one meter to millimeters. Microwaves are used in communication and radar technology. Some television and telephone communications are transmitted long distances by microwaves between ground stations and communications satellites. Microwaves can be absorbed by molecules that have dipole moments.

Infrared radiation is characterized by wavelengths that range from about a millimeter to several hundred nanometers. Infrared energy is emitted or absorbed by molecules when changing rotational-vibrational movements. Infrared energy elicits vibrational modes in a molecule through a change in the dipole moment, making infrared a useful frequency range for study of these energy states for molecules. Most thermal energy emitted from objects at room temperature is infrared.

The visible region of the EM spectrum is the portion of the spectrum to which the human eye is most sensitive. Electromagnetic radiation with wavelengths of between 380 and 760 nanometers is detectable by the human eye and perceived as visible light.

Ultraviolet (UV) radiation typically has wavelengths between 100 and 400 nanometers. UV light can be found in sunlight and has the potential to damage biological molecules due to its ability to alter chemical bonds. UV rays having very short wavelengths can ionize molecules.

X-rays have wavelengths in the range of about one to tenths of a nanometer. X-rays have the ability to penetrate through relatively thick objects without much scattering or absorption, thus making them useful for imaging visually opaque objects and are widely used in medical radiography and airport security scanners.

Gamma rays have extremely short wavelengths and a very high frequency. Natural sources of gamma rays include decay from naturally occurring radioisotopes. Gamma rays are also found in space as a result of supernova explosions. Due to their high energy, gamma rays are highly penetrating and can diffuse throughout the human body and cause radiation sickness.

Radar (radio detection and ranging) is a system that can use radio waves or microwaves to determine the range, altitude, speed, and direction of objects. Radio waves are a portion of the electromagnetic spectrum and are characterized by low frequency and long wavelengths. A radar system can use radio waves as a mechanism for the detection of objects.

Ultra-wideband (UWB) radar systems can use radio waves to transmit information spread over large bandwidths, for example, greater than 500 MHz. UWB radar systems can accomplish this task via pulse-modulation of the signal, in that UWB transmissions transmit information by generating radio waves at specific time intervals over a large bandwidth. Non-UWB transmissions can employ continuous signaling in which only the frequency, power level, or phase of the wave, but not the time interval, is changed.

Doppler radar utilizes the Doppler effect to produce velocity data about objects at a distance. Doppler radar can transmit an electromagnetic signal toward a desired target and listen for a reflection from the target. This process allows for analysis of how the object's motion alters the frequency of the returned signal and provides data about the object's velocity. In some embodiments, a device described herein is configured to detect fetal heartbeat by Doppler radar. Doppler radar allows for both high penetration depth and detection sensitivity, which can be particularly suitable for early pregnancy detection of large non-human domesticated animals. High penetration depth allows for the transmission of signals to the small, developing fetal heart through layers of hair and dermis of a pregnant subject. High detection sensitivity allows for the detection of signals arising from relatively small motion variations of the fetal heart during the earliest stages of development. For example, a cow fetus is only a few centimeters in size at 30 days of gestation. Devices described herein can be used to detect rhythmic motion amplitudes arising from an even smaller heart. In some cases, a device described herein does not employ a UWB system that requires a larger bandwidth. Larger bandwidths can lead to higher signal loss, which can obscure signals arising from small motion variations of a fetal heart.

In some embodiments, a device described herein is configured to transmit electromagnetic waves toward a fetal heart in a subject by a distance of at least 5 cm, at least 6 cm, at least 7 cm, at least 8 cm, at least 9 cm, at least 10 cm, at least 11 cm, at least 12 cm, at least 13 cm, at least 14 cm, at least 15 cm, at least 16 cm, at least 17 cm, at least 18 cm, at least 19 cm, at least 20 cm, at least 21 cm, at least 22 cm, at least 23 cm, at least 24 cm, at least 25 cm, at least 26 cm, at least 27 cm, at least 28 cm, at least 29 cm, at least 30 cm, at least 31 cm, at least 32 cm, at least 33 cm, at least 34 cm, at least 35 cm, at least 36 cm, at least 37 cm, at least 38 cm, at least 39 cm, at least 40 cm, at least 41 cm, at least 42 cm, at least 43 cm, at least 44 cm, at least 45 cm, at least 46 cm, at least 47 cm, at least 48 cm, at least 49 cm, or at least 50 cm. For example, a device described herein is configured to transmit electromagnetic waves toward a fetal heart in a subject by a distance of about 5 cm to about 50 cm, about 10 cm to about 50 cm, about 20 cm to about 50 cm, or about 20 cm to about 30 cm.

In some embodiments, a device described herein is configured to transmit electromagnetic waves through at least 1 cm, at least 2 cm, at least 3 cm, at least 4 cm, at least 5 cm, at least 6 cm, at least 7 cm, at least 8 cm, at least 9 cm, at least 10 cm, at least 11 cm, at least 12 cm, at least 13 cm, at least 14 cm, at least 15 cm, at least 16 cm, at least 17 cm, at least 18 cm, at least 19 cm, at least 20 cm, at least 21 cm, at least 22 cm, at least 23 cm, at least 24 cm, at least 25 cm, at least 26 cm, at least 27 cm, at least 28 cm, at least 29 cm, at least 30 cm, at least 31 cm, at least 32 cm, at least 33 cm, at least 34 cm, at least 35 cm, at least 36 cm, at least 37 cm, at least 38 cm, at least 39 cm, at least 40 cm, at least 41 cm, at least 42 cm, at least 43 cm, at least 44 cm, at least 45 cm, at least 46 cm, at least 47 cm, at least 48 cm, at least 49 cm, at least 50 cm of body tissue. For example, a device described herein is configured to transmit electromagnetic waves through about 1 cm to about 5 cm, about 2 cm to about 3 cm, about 5 cm to about 50 cm, about 5 cm to about 20 cm, about 10 cm to about 50 cm, about 20 cm to about 50 cm, or about 20 cm to about 30 cm of body tissue.

CW Doppler radar transmits a continuous wave of radio energy, allowing for the determination of an object's velocity without providing any range or distance data. Frequency-modulated continuous wave (FMCW) Doppler radar differs from CW Doppler radar in that the frequency of the transmitted signal can be varied, allowing for measurements of an object's distance. Use of pseudorandom code modulated continuous wave radar can provide further refinement as to an object's distance and range. This refinement occurs via modulation of the transmitter's codes to meet frequency and range requirements for the objects of interest.

Pulsed Doppler radar uses pulse-timing techniques and the Doppler effect to determine the distance of an object. Pulsed Doppler systems differ from continuous wave systems by sending short pulses of radio energy rather than a continuous transmission of radio energy to an object. The range of an object is determined by the measuring the elapsed time between pulses sent to and reflected off the object.

In some embodiments, multiple radar sensors can be used to increase the accuracy of the cardiac measurements. Multiple radar sensors also measure heart motion profiles from different positions of view and generate a multi-dimensional data set that can be inverted to solve for the motion of the heart in two dimensions. This method can provide accurate measurements by reducing the effect of random movement or misalignment of individual radar sensors.

Figure 8:
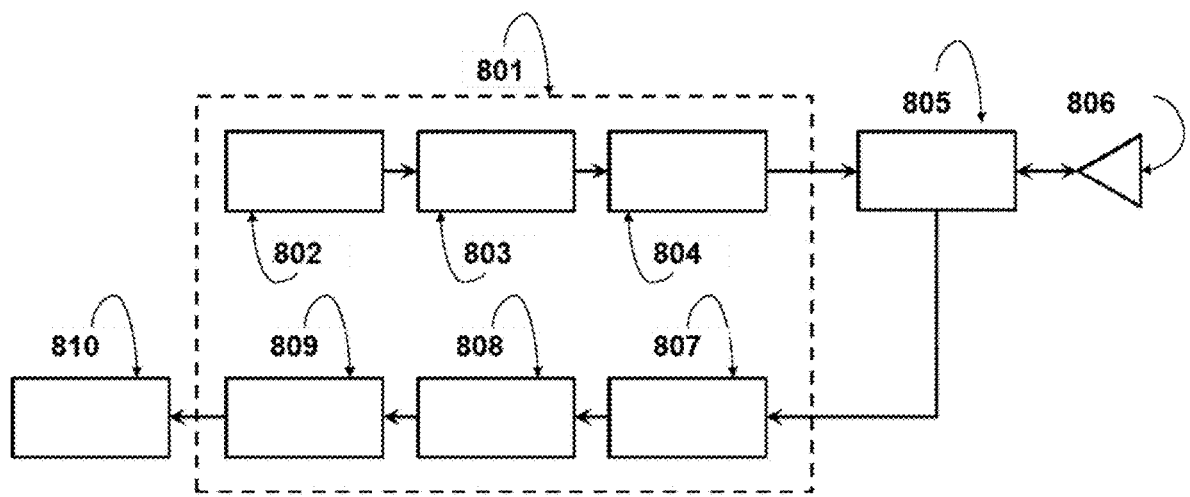
FIG. 8 illustrates an embodiment of a device described herein to determine a fetal heart rate in a pregnant subject.

FIG. 8 illustrates an embodiment of a device described herein to determine a heart rate in a subject. Within a printed circuit board 801, a voltage-controlled oscillator 802 generates a waveform. The waveform is then propagated through a splitter 803 and a first amplifier 804 to the circulator 805. The waveform is then carried from a circulator 805 to an antenna 806. A reflected waveform is then carried from the antenna 806 to the circulator 805. The waveform is then propagated to a second amplifier 807. The waveform is then filtered through a bandpass filter 808. The filtered waveform is then decoded using a quadrature demodulation chip 809. The decoded waveform is then transmitted to a signal acquisition unit 810. In some embodiments, the device comprises a radar system. Non-limiting examples of the types of radar that can be used in the device include ultrawide bandwidth (UWB) radar, CW Doppler radar, pulsed Doppler radar, frequency-modulated CW radar, and pseudorandom code modulated CW radar.

In some embodiments, a device described herein comprises a monostatic radar architecture, wherein only one antenna is used for both transmission and reception. In some embodiments, a device described herein comprises a duplexer, which can separate transmitted and received signals when one antenna is used for both transmission and reception. In a monostatic radar system, signals generated are passed directly to the antenna, while received signals from the antenna are routed to the receiver portion. A duplexer can provide isolation between the transmit and receive paths, allowing for one antenna to perform both functions.

In some embodiments, a device described herein comprises a bistatic radar architecture. In a device comprising a bistatic radar architecture, two antennas are spatially separated for the transmit and receive paths.

Non-limiting examples of antennae that can be used in the device include an isotropic radiator, a dipole antenna, a Yagi-Uda antenna, a random wire antenna, a horn antenna, a parabolic antenna, and a patch antenna. In some embodiments, the antenna can be detachable or removable from the device. In some embodiments, the antenna can be interchangeable or exchangeable for a different antenna, for example, an antenna of a differing strength. The antenna can be placed, for example, inside, outside, in proximity to, adjacent to, on top of, or below the device.

A device can comprise a computer system that can receive data associated with a signal reflecting off the subject's heart. The data that is received by the computer system can then be compared by a processor of the computer system to a reference to determine whether the subject has an irregular heartbeat. Non-limiting examples of references that can be used by the computer system include past measurements from the subject, measurements from a healthy subject, statistical averages of the symptom being measured, and reference texts. The computer system can then output a result of the determination. In some embodiments, the processor is located in a housing common to the source of the signal in the device. In some embodiments, the processor is not located in a housing common to the source of the signal in the device.

In some embodiments, the device comprises a processor coupled to a transmitter configured to transmit data from the device to a remote location, for example, a hospital, a clinic, or a doctor's office. The transmitter can be configured to transmit data wirelessly, for example, via Bluetooth, wireless networks, cell phone networks, a cloud network, or the internet. For example, the device can use Bluetooth© to connect to an analysis device, including but not limited to, a cell phone or computer system. In some embodiments, the transmission is wired. The processor can be configured to transmit data to a plurality of receivers in a plurality of geographic locations. In some embodiments, the processor can transmit data over a distance of about 1 mile, about 2 miles, about 3 miles, about 4 miles, about 5 miles, about 6 miles, about 7 miles, about 8 miles, about 9 miles, or about 10 miles. In some embodiments, the processor can transmit data over a distance of at least 10 miles. In some embodiments, the processor can transmit data over a distance of at least 50 miles. In some embodiments, the device comprises a Global Positioning System (GPS).

A device described herein can be, or cannot be, worn by a subject. The device can be attached to a subject's body using, for example, a harness, a blanket, a chest strap, a chest vest, a belt, an adhesive tape, or glue. The device can also be unattached from the subject's body. A device described herein can be attached to, for example, a wall, a headboard, a bed, a chair, or other furniture in proximity to the subject.

A device described herein can be used by a subject hourly, daily, weekly, monthly, yearly, occasionally, frequently, continuously, or chronically. A device described herein can be used by a subject as needed based on a condition of the subject, upon a physician's recommendation, as desired by the subject, as required to monitor the condition of the subject properly, or for diagnostic or research purposes.

In some embodiments, a device described herein can detect fetal heartbeat in a pregnant subject within 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 60 days, 70 days, 80 days, 90 days, 100 days, 150 days, 200 days, 250 days or more days of gestation.

In some embodiments, a device of the invention has an average output power of about 1 µW, about 2 µW, about 3 µW, about 4 µW, about 5 µW, about 6 µW, about 7 µW, about 8 µW, about 9 µW, about 10 µW, about 20 µW, about 30 µW, about 40 µW, about 50 µW, about 60 µW, about 70 µW, about 80 µW, about 90 µW, about 100 µW, about 200 µW, about 300 µW, about 400 µW, about 500 µW, about 600 µW, about 700 µW, about 800 µW, about 900 µW, about 1 mW, about 2 mW, about 3 mW, about 4 mW, about 5 mW, about 6 mW, about 7 mW, about 8 mW, about 9 mW, about 10 mW, about 15 mW, about 20 mW, about 25 mW, about 30 mW, about 35 mW, about 40 mW, about 45 mW, about 50 mW, about 60 mW, about 70 mW, about 80 mW, about 90 mW, or about 100 mW.

A device described herein can produce pulses of electromagnetic waves. The duration of the pulses can be about 1 ps, about 2 ps, about 3 ps, about 4 ps, about 5 ps, about 6 ps, about 7 ps, about 8 ps, about 9 ps, about 10 ps, about 20 ps, about 30 ps, about 40 ps, about 50 ps, about 60 ps, about 70 ps, about 80 ps, about 90 ps, about 100 ps, about 110 ps, about 120 ps, about 130 ps, about 140 ps, about 150 ps, about 160 ps, about 170 ps, about 180 ps, about 190 ps, about 200 ps, about 250 ps, about 300 ps, about 350 ps, about 400 ps, about 450 ps, about 500 ps, about 600 ps, about 700 ps, about 800 ps, about 900 ps, about 1 ns, about 2 ns, about 3 ns, about 4 ns, about 5 ns, about 6 ns, about 7 ns, about 8 ns, about 9 ns, about 10 ns, about 20 ns, about 30 ns, about 40 ns, about 50 ns, about 60 ns, about 70 ns, about 80 ns, about 90 ns, about 100 ns, about 200 ns, about 300 ns, about 400 ns, about 500 ns, about 600 ns, about 700 ns, about 800 ns, about 900 ns, or about 1 µs.

The repetition rate of the pulses or frequency can be about 0.1 MHz, about 0.2 MHz, about 0.3 MHz, about 0.4 MHz, about 0.5 MHz, about 0.6 MHz, about 0.7 MHz, about 0.8 MHz, about 0.9 MHz, about 1 MHz, about 2 MHz, about 3 MHz, about 4 MHz, about 5 MHz, about 6 MHz, about 7 MHz, about 8 MHz, about 9 MHz, about 10 MHz, about 15 MHz, about 20 MHz, about 25 MHz, about 30 MHz, about 35 MHz, about 40 MHz, about 45 MHz, about 50 MHz, about 60 MHz, about 70 MHz, about 80 MHz, about 90 MHz, or about 100 MHz.

Non-limiting examples of device shape include a cube, a sphere, a cylinder, a square, a rectangle, and a circle. A device described herein can have a height (H), width (W), and depth (D), each independently of about 0.05 inches, about 0.1 inches, about 0.15 inches, about 0.2 inches, about 0.25 inches, about 0.3 inches, about 0.35 inches, about 0.4 inches, about 0.45 inches, about 0.5 inches, about 0.6 inches, about 0.7 inches, about 0.8 inches, about 0.9 inches, or about 1 inch. In some embodiments, the device is a cube. In some embodiments, the device can have dimensions of about 1 inch height by about 1 inch width by about 0.2 inches depth.

Non-limiting examples of materials that can be used in the manufacture of the device include polyvinyl chloride, polyethylene, polypropylene, polystyrene, polyurethane, polyethylene terephthalate, polycarbonate, silicone, and combinations thereof. Further non-limiting examples of materials that can be used in the manufacture of the device include steel, low-carbon steel, medium-carbon steel, high-carbon steel, aluminum, brass, copper, lead, magnesium, nickel, titanium, zinc, and combinations thereof. Additional non-limiting examples of materials that can be used in the manufacture of the device include copper wire, aluminum wire, XHHW wire, THWN wire, and THEN wire.

Non-limiting examples of chips that can be used in the manufacture of the device include dynamic random access memory chips, microprocessors, application specific integrated circuits, digital signal processors, programmable memory chips, and combinations thereof.

Non-limiting examples of semiconductors that can be used in the manufacture of the device include diamond, silicon, germanium, tin, silicon carbide, selenium, tellurium, boron nitride, zinc oxide, copper (I) oxide, and combinations thereof.

In some embodiments, the device has a total mass of less than about 100 grams. The total mass of the device can be about 1 gram, about 2 grams, about 3 grams, about 4 grams, about 5 grams, about 6 grams, about 7 grams, about 8 grams, about 9 grams, about 10 grams, about 15 grams, about 20 grams, about 25 grams, about 30 grams, about 35 grams, about 40 grams, about 45 grams, about 50 grams, about 60 grams, about 70 grams, about 80 grams, about 90 grams, about 100 grams, about 110 grams, about 120 grams, about 130 grams, about 140 grams, about 150 grams, about 200 grams, about 250 grams, about 300 grams, about 350 grams, about 400 grams, about 450 grams, about 500 grams, about 550 grams, about 600 grams, about 650 grams, about 700 grams, about 750 grams, about 800 grams, about 850 grams, about 900 grams, about 950 grams, or about 1000 grams.

Any tool, interface, engine, application, program, service, command, or other executable item can be provided as a module encoded on a computer-readable medium in computer executable code. In some embodiments, the invention provides a computer-readable medium encoded therein computer-executable code that encodes a method for performing any action described herein, wherein the method comprises providing a system comprising any number of modules described herein, each module performing any function described herein to provide a result, such as an output, to a user.

EXAMPLES

Example 1. Validation Experiments in a Maternal Cow Using Transrectal Ultrasound and Palpation A fetal heartbeat monitoring device described herein was used to demonstrate the feasibility of detecting the presence of a fetal heartbeat in a pregnant subject by comparing detected rhythmic heart motion with conventional pregnancy testing by transrectal ultrasound and palpation. The device having a radar monitor was attached to a pregnant dairy cow subject at 36 days post-insemination.

Figure 9:
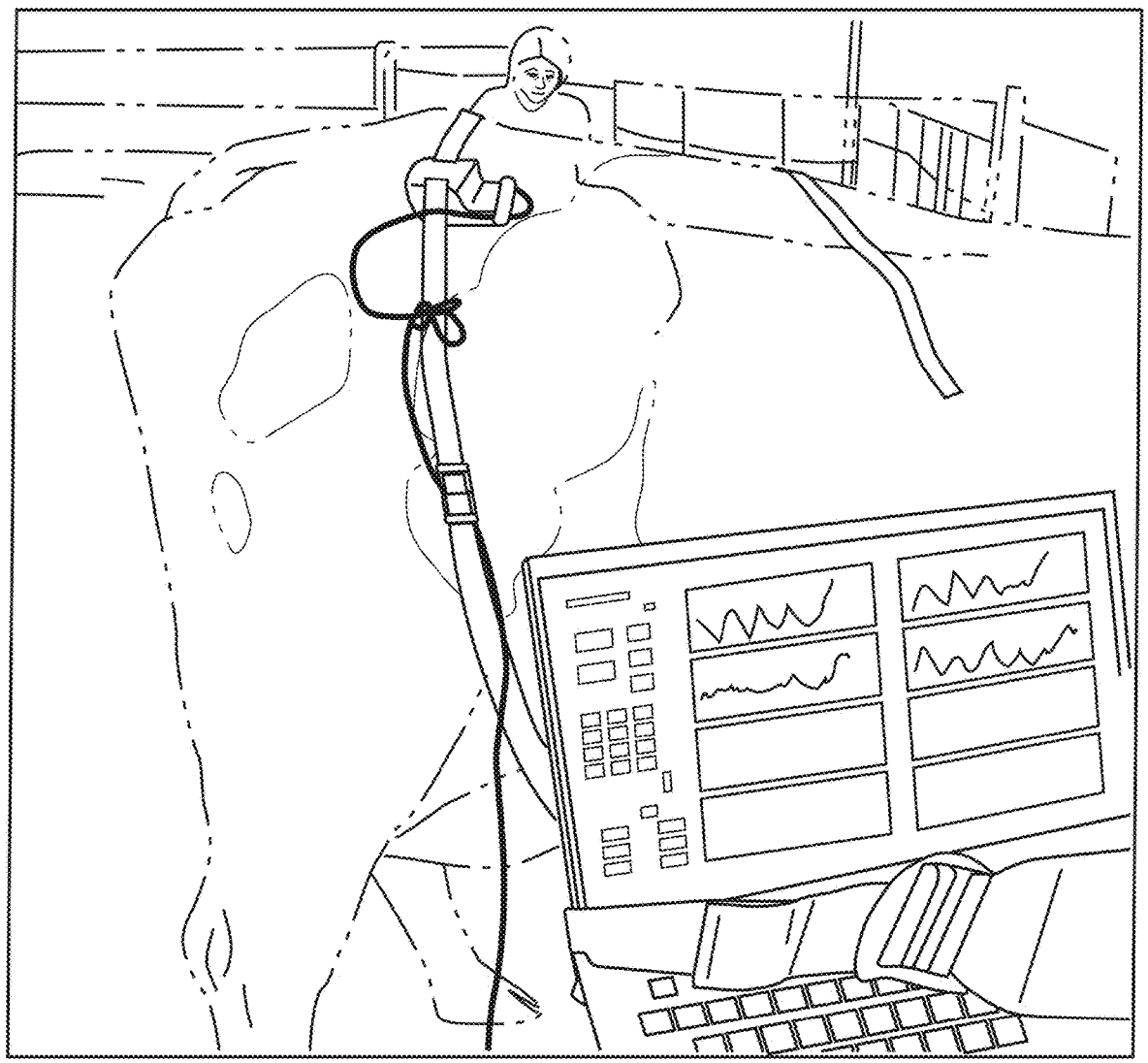
FIG. 9 illustrates an example placement of a device described herein on the pregnant subject in which the device is embedded on a strap.

Simultaneously, heart motion was monitored transdermally at two locations: on the back right side of the spine (as viewed from the rear) and in front of the wing of ilium (large hip bones). These areas of the cow provided the least obscured detection site (by bone and muscle) of the uterine horns where the calf fetus attaches. FIG. 9 illustrates placement of the device on the pregnant subject in which the device is embedded on a strap.

Figure 10:
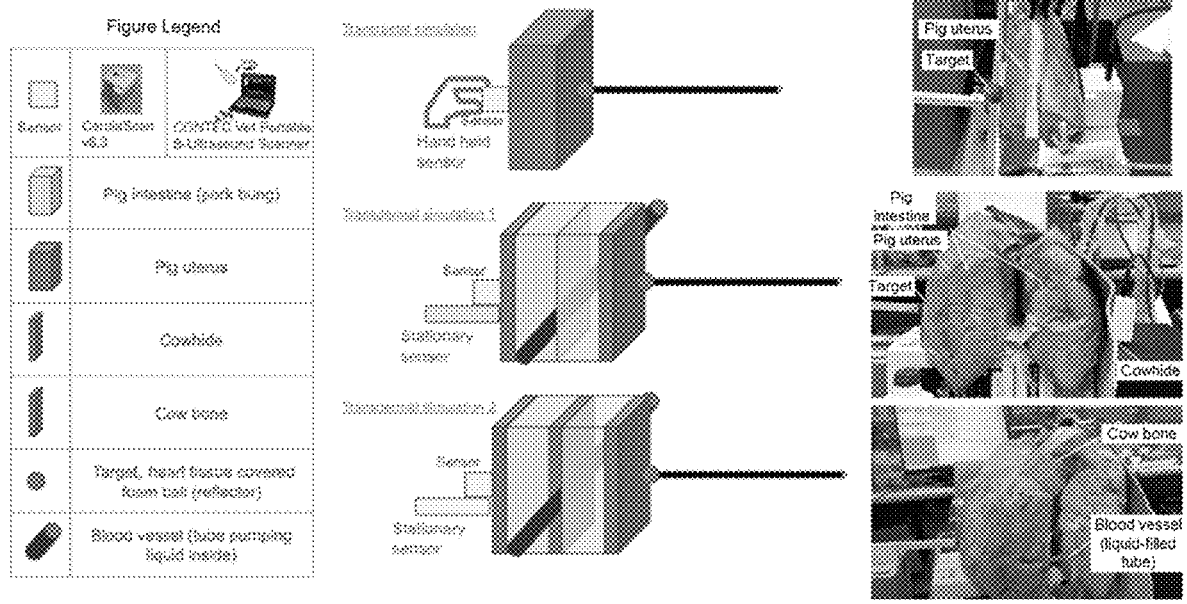
FIG. 10 illustrates simulations of a fetal heart environment in a pregnant subject.

Example 2. Validation Experiments in Simulated Maternal Subject Using a Simulated Fetal Heartbeat Sensitivity for motion detection and depth penetration of a fetal heartbeat monitoring device described herein was assessed by simulating an early fetus moving in a maternal subject. Measurements obtained by the device were compared to measurements obtained by ultrasound. Schematics of the simulations using pig and cow tissue are illustrated in FIG. 10. The fetal heart target was simulated using a foam ball reflector covered with pig heart tissue. Different types and quantity of tissue were placed between the target and the sensor of the device.

For the transrectal simulation, a layer of pig uterus tissue was placed between the target and the sensor of the device.

For transdermal simulation 1, a layer of cowhide, two layers of pig intestine, and a layer of pig uterus tissue were placed between the target and the sensor of the device. A simulated blood vessel was used to simulate effects of the maternal subject's arterial motion that may obscure the motion of the fetus. The blood vessel was simulated using a plastic tube placed between the two layers of pig intestine. A stationary sensor was also utilized in the simulation test.

Transdermal simulation 2 was similar to transdermal simulation 1 except that an additional layer of cow bone was placed between the two layers of pig intestine.

Figure 11:
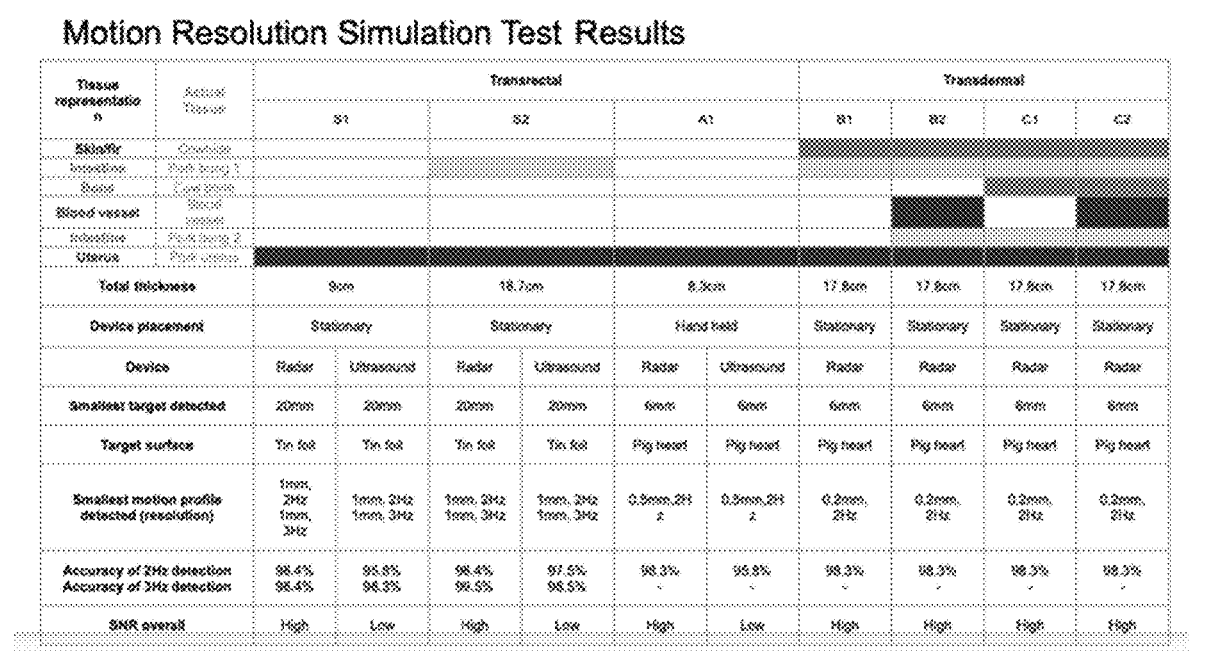

Motion resolution test results of the three simulations are summarized in FIG. 11. The limitations in depth of penetration and the amplitude of motion that can be observed are based on the particular electronics and antenna design described herein. The experiments verify that objects as small as 6 mm in diameter with motion amplitude of 0.2 mm and at depth of 17.8 cm (i.e., the value expected for the location of the fetus) can be detected using the device described herein. The radar sensitivity to motion was observed to be similar or better than the sensitivity observed using ultrasound, which cannot detect signals through bone. As such, the radar monitor can be configured for transdermal use instead of rectal use required for transrectal ultrasound detection. This transdermal configuration can be desirable especially during early stage fetal monitoring to minimize the likelihood of injury to the fetus.

Figure 12:
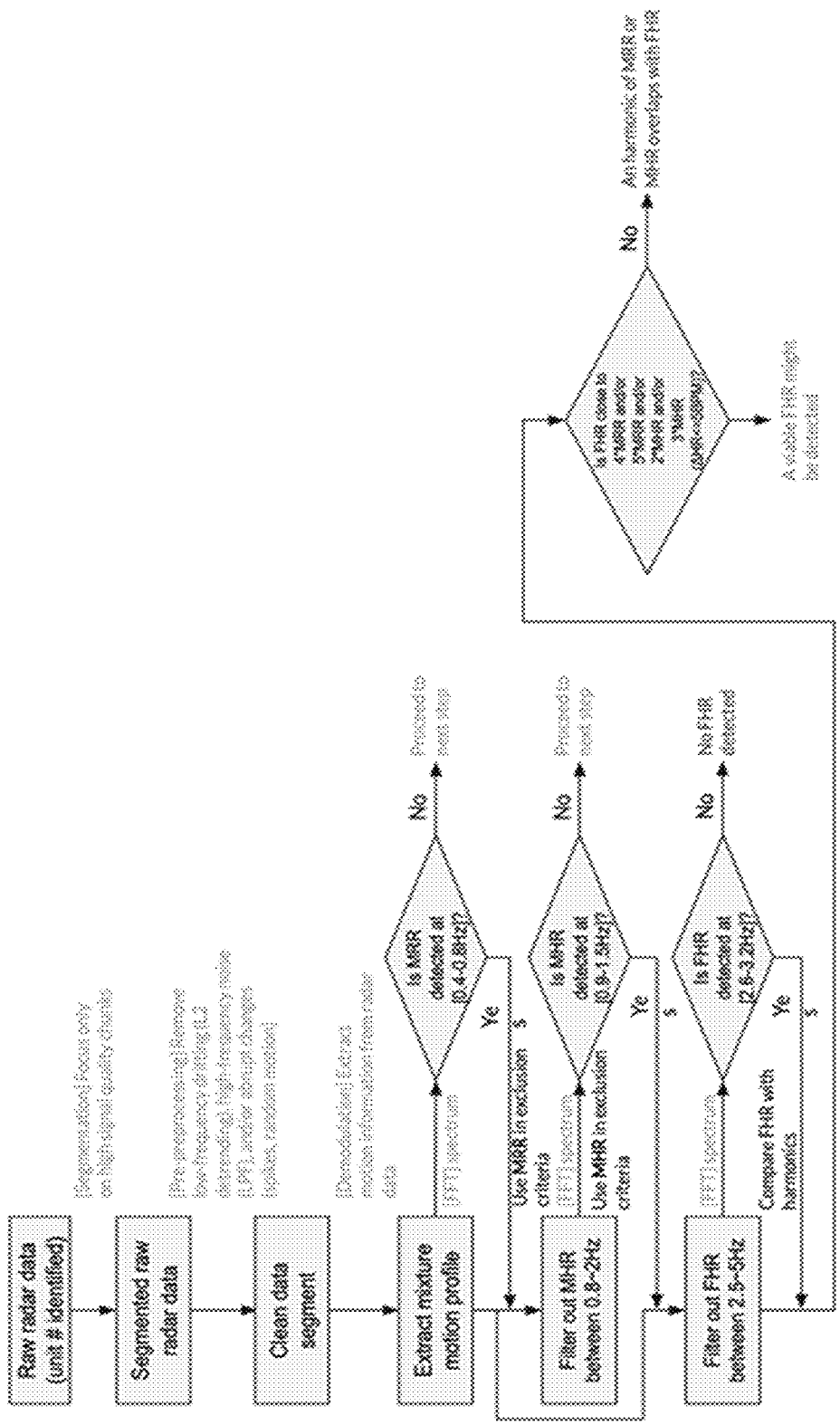
FIG. 12 illustrates an example algorithm schematic of the signal processing flow for a fetal heartrate detection system or device described herein.
Figure 13:
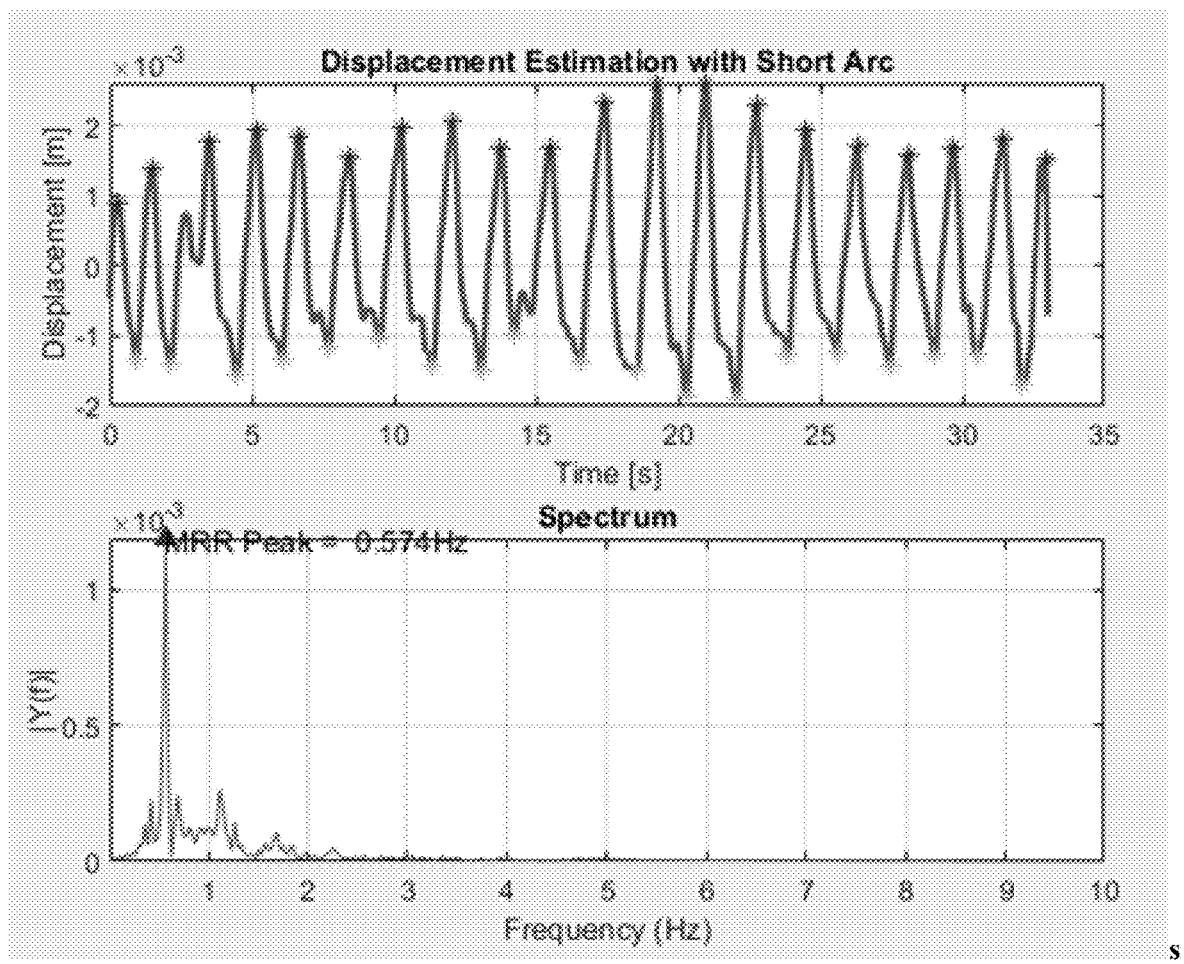
FIG. 13 illustrates extracted mixture heart motion data generated by a system described herein.
Figure 14:
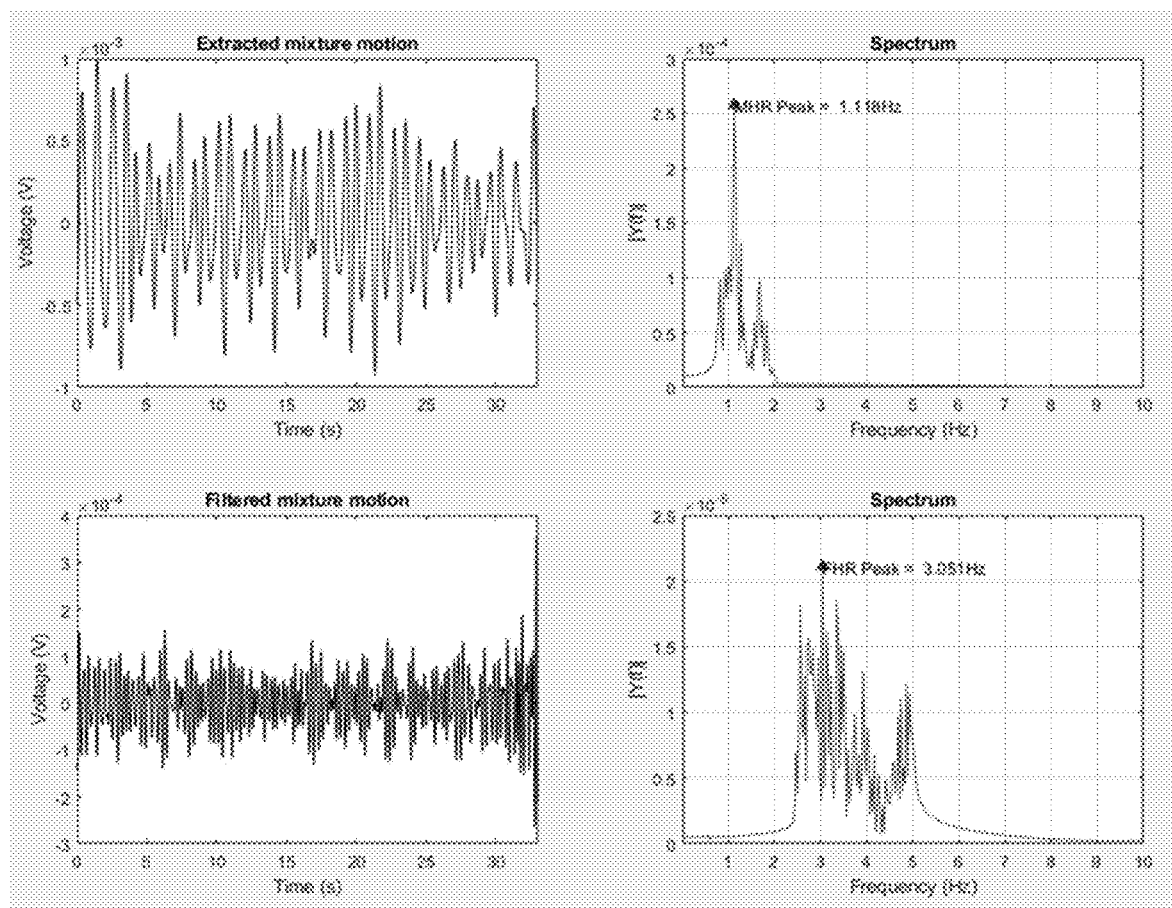
FIG. 14 illustrates filtered heart motion data generated by a system described herein.

FIG. 12 illustrates an example algorithm schematic of the signal processing flow for a fetal heartrate detection system or device described herein. Raw radar data collected from the device undergo segmentation to focus on high signal quality data, thereby generating segmented raw radar data. The segmented raw radar data then undergo pre-processing to remove low-frequency drifting, high frequency noise, and/or abrupt signal changes (e.g., spikes or random motion), thereby generating clean data segment. The clean data segment then undergo demodulation to extract motion information from the radar data, thereby producing an extracted mixture motion profile as shown in FIG. 13. The mixture motion data containing maternal heart rate (MHR), maternal respiration rate (MRR), and fetal heart rate (FHR) data then undergo bandpass filtering to remove MHR and MRR data. FFT can then be apply on the filtered data to extract the FHR signals. A computer code was used to reject (filter out) data associated with random movements of the mother and to reject (filter out) frequencies of motion that were too fast or too slow to be associated with a fetus, thereby producing filtered motion profiles as shown in FIG. 14.

Figure 15:
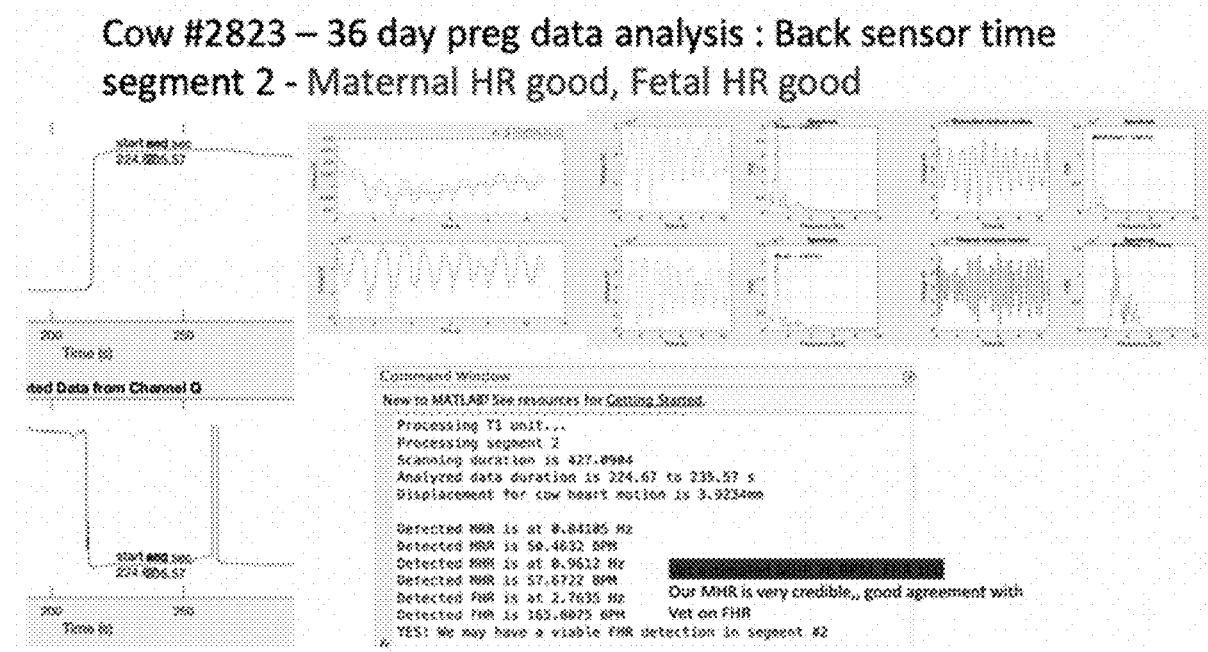
FIG. 15 illustrates example data generated from a heart monitoring device described herein.

FIG. 15 illustrates data and analysis showing a maternal heartbeat of 56.7 beats/min and another heartbeat at 165 beats/min, corresponding to the heartbeat of the fetus determined by a veterinarian using ultrasound imaging. A veterinarian used transrectal imaging of the fetus to determine the motion associated with the fetal heartbeat.

Figure 16:
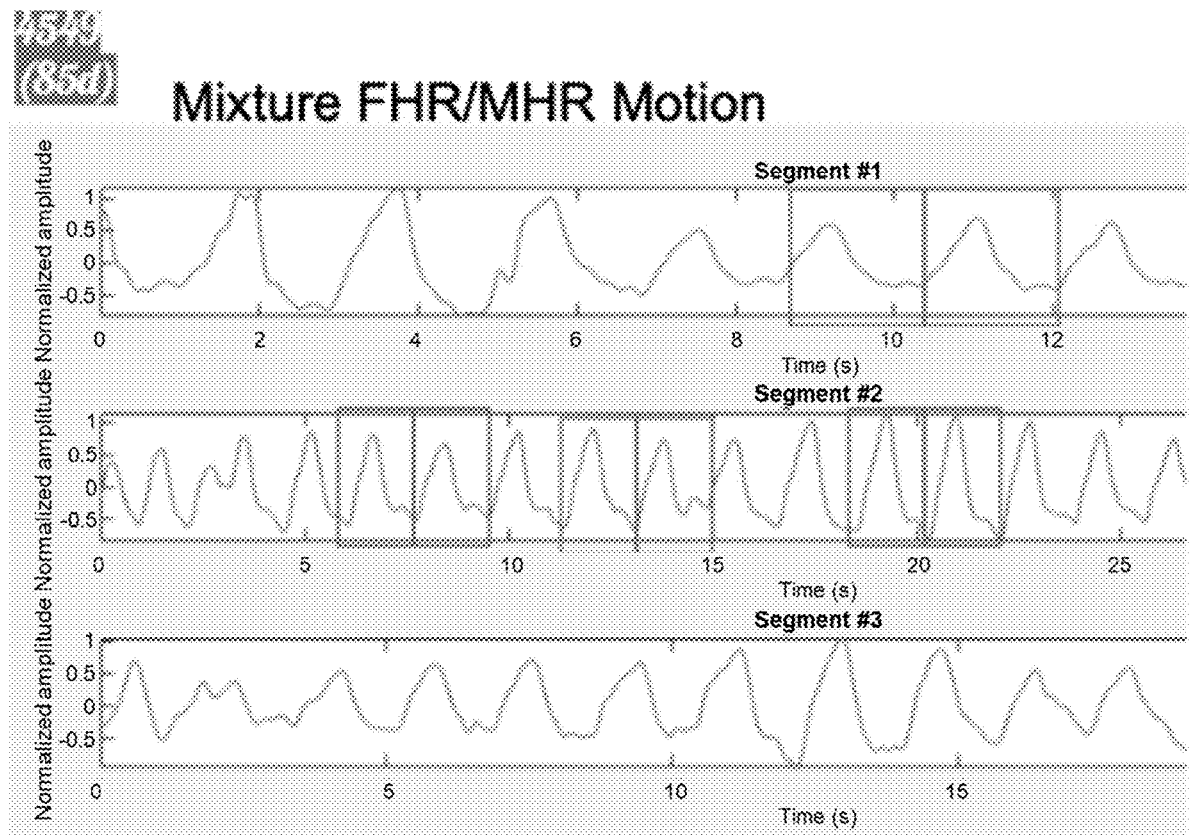
FIG. 16 illustrates example data generated from a heart monitoring device described herein.

FIG. 16 illustrates a periodic motion waveform (i.e., the maternal heartbeat) intermingled with a smaller amplitude, but more rapid fetal heartbeat. Each segment represents data acquired at different time intervals while monitoring the cow. Segments #1-#3 highlight areas of observed motion data containing more than one frequency (likely attributed to maternal heart motion data mixed with fetal heart motion data). Instead of a single rhythm of motion arising from a single heartbeat, two different rhythms arising from two different heartbeats merged together are observed.

TABLE 1 and TABLE 2 provide summaries of the results. Based on the studies, the device described herein detected minute motions through up to about 20 cm thick tissue in contact mode. The signal SNR was relatively high, suggesting high sensitivity to minute trans-tissue motion/vibrations. The device also tolerated some hand-motion even while target motions were minute. In contrast, the ultrasound scanner provided low image resolution and did not tolerate hand-motion with minute target motions. Heart rate accuracy using ultrasound is also variable as measurements are governed by machine resolution and the operator. Ultrasound measurements are also greatly affected by body motion and organ movements.

Embodiments

Embodiment 1. A device comprising: a) a transmitter configured to transmit electromagnetic waves to a heart of a fetus in a subject; and b) a fetal sensor configured to detect signals reflected from the heart in response to the electromagnetic waves transmitted to the heart by the transmitter, wherein the transmitter is configured to transmit the electromagnetic waves by a distance of at least 10 cm to the heart of the fetus.

Embodiment 2. The device of embodiment 1, wherein the transmitter is configured to transmit the electromagnetic waves through at least 10 cm of body tissue, and the fetal sensor is configured to detect signals that have passed through at least 10 cm of the body tissue.

Embodiment 3. The device of embodiment 1 or 2, wherein the transmitter is configured to transmit the electromagnetic waves to a surface of the heart of the fetus.

Embodiment 4. The device of any one of embodiments 1-3, wherein the fetal sensor is configured to detect signals reflected from the heart using Doppler radar.

TABLE 1

| Device configuration | A Transrectal | B1 Transdermal | B2 Transdermal | C1 Transdermal | C2 Transdermal |
|---|---|---|---|---|---|
| Tissue composition & thickness | uterus, 8.3 cm | uterus + bung, 17.8 cm | uterus + bung + blood vessel, 17.8 cm | uterus + bung + bone, 17.8 cm | uterus + bung + bone + blood vessel, 17.8 cm |
| Device placement | handheld | stationary | stationary | stationary | stationary |
| Device | radar ultrasound | radar | radar | radar | radar |
| Target size 10 mm | 1 mm/2 BPM error / Not detected | 0.2 mm/2 BPM error | 0.2 mm/2 BPM error | 0.2 mm/2 BPM error | 0.2 mm/2 BPM error |
| Target size 6 mm | 0.5 mm/2 BPM error / 0.5 mm/5 BPM error | 0.2 mm/2 BPM error | 0.2 mm/2 BPM error | 0.2 mm/2 BPM error | 0.2 mm/2 BPM error |

TABLE 2

Transrectal (handheld sensor) Measurement Results
- comparing sensitivity between radar and ultrasound scanner

| Target diameter | φ = 10 mm | | φ = 6 mm | |
|---|---|---|---|---|
| Sensor type | Radar | Ultrasound | Radar | Ultrasound |
| Motion type 1 mm @ 2 Hz | 1.968 Hz | Not detected | 1.97 Hz (I) | 2.075 Hz |
| 0.5 mm @ 2 Hz | Not detected | Not detected | 1.968 (Q) | 1.91 Hz |
| 0.2 mm @ 2 Hz | Not detected | Not detected | Not detected | Not detected |

Transrectal Simulation 1 Results (stationary sensor)
- test motion sensitivity under realistic cow tissue model (without bone)

| Target diameter | φ = 10 mm | | φ = 6 mm | |
|---|---|---|---|---|
| Blood vessel pumping | No (B1) | Yes (B2) | No (B1) | Yes (B2) |
| Motion type 1 mm @ 2 Hz | 1.97 Hz | 1.968 Hz | 1.967 Hz | 1.968 Hz |
| 0.5 mm @ 2Hz | 1.97 Hz | 1.967 Hz (I) | 1.968 Hz | 1.967 Hz (I/Q) |
| 0.2 mm @ 2 Hz | 1.97 Hz | 1.968 Hz (I) | 1.968 Hz | 1.967 Hz (I/Q) |

Transrectal Simulation 2 Results (stationary sensor)
- test motion sensitivity under realistic cow tissue model (with bone)

| Target diameter | φ = 10 mm | | φ = 6 mm | |
|---|---|---|---|---|
| Blood vessel pumping | No (C1) | Yes (C2) | No (C1) | Yes (C2) |
| Motion type 1 mm @ 2 Hz | 1.968 Hz | 1.968 Hz | 1.97 Hz (I) | 1.968 Hz |
| 0.5 mm @ 2 Hz | 1.97 Hz | 1.968 Hz | 1.97 Hz (I) | 1.967 Hz |
| 0.2 mm @ 2 Hz | 1.968 Hz | 1.967 Hz | 1.967 Hz | 1.967 Hz (I/Q) |

Embodiment 5. The device of any one of embodiments 1-4, wherein the fetal sensor is not configured to detect signals reflected from the heart using ultra-wideband (UWB) radar.

Embodiment 6. The device of any one of embodiments 1-5, wherein the fetal sensor is configured to detect signals reflected from the heart of the fetus within 30 days of gestation.

Embodiment 7. The device of any one of embodiments 1-5, wherein the fetal sensor is configured to detect signals reflected from the heart of the fetus within 40 days of gestation.

Embodiment 8. The device of any one of embodiments 1-7, wherein the signals reflected from the heart of the fetus are indicative of a heartbeat of the fetus.

Embodiment 9. The device of any one of embodiments 1-8, wherein the signals reflected from the heart of the fetus are indicative of a heart rate of the fetus.

Embodiment 10. The device of any one of embodiments 1-9, wherein the fetal sensor is configured to be placed in contact with the subject's skin in proximity to the subject's uterus.

Embodiment 11. The device of any one of embodiments 1-10, wherein the fetal sensor is configured to be placed in contact with the subject's skin in proximity to the subject's uterine horns.

Embodiment 12. The device of any one of embodiments 1-11, wherein the fetal sensor is configured to be placed in contact with the subject's skin at the subject's right lower back as viewed from the subject's rear.

Embodiment 13. The device of any one of embodiments 1-12, wherein the fetal sensor is embedded in a fabric.

Embodiment 14. The device of any one of embodiments 1-13, wherein the fetal sensor is embedded in a strap.

Embodiment 15. The device of any one of embodiments 1-9, wherein the fetal sensor is configured to be inserted into the subject's rectum.

Embodiment 16. The device of any one of embodiments 1-9, wherein the fetal sensor is embedded in a rectal probe.

Embodiment 17. The device of any one of embodiments 1-16, wherein the transmitter and the fetal sensor are in a common housing.

Embodiment 18. The device of any one of embodiments 1-17, further comprising a maternal sensor configured to detect a heart rate of the subject.

Embodiment 19. The device of embodiment 18, wherein the maternal sensor is configured to be placed in contact with the subject's skin in proximity to the subject's heart.

Embodiment 20. The device of embodiment 18 or 19, wherein the maternal sensor is embedded in a fabric.

Embodiment 21. The device of any one of embodiments 18-20, wherein the maternal sensor is embedded in a strap.

Embodiment 22. The device of any one of embodiments 18-21, further comprising a second maternal sensor configured to detect the heart rate of the subject.

Embodiment 23. The device of any one of embodiments 18-22, wherein the heart rate of the fetus is greater than the heart rate of the subject.

Embodiment 24. The device of any one of embodiments 1-23, wherein the subject is a non-human animal.

Embodiment 25. The device of any one of embodiments 1-23, wherein the subject is a livestock.

Embodiment 26. The device of any one of embodiments 1-23, wherein the subject is a ruminant.

Embodiment 27. The device of any one of embodiments 1-23, wherein the subject is a bovine.

Embodiment 28. The device of any one of embodiments 1-23, wherein the subject is a dairy cow.

Embodiment 29. The device of any one of embodiments 1-23, wherein the subject is an ungulate.

Embodiment 30. The device of any one of embodiments 1-23, wherein the subject is an equine.

Embodiment 31. A method comprising: a) transmitting through skin of a subject by a transmitter electromagnetic waves to a heart of a fetus inside the subject; and b) detecting by a fetal sensor a signal reflected from the heart of the fetus in response to the electromagnetic waves transmitted to the heart of the fetus, wherein the heart of the fetus is disposed at a depth of at least 10 cm beneath the skin of the subject.

Embodiment 32. The method of embodiment 31, further comprising determining a presence of the fetus in the subject based on detecting the signal.

Embodiment 33. The method of embodiment 32, wherein the presence of the fetus in the subject is based on a periodicity of the signal reflected from the heart of the fetus in response to the electromagnetic waves transmitted to the heart of the fetus.

Embodiment 34. The method of any one of embodiments 31-33, further comprising determining a heart rate of the fetus based on the detected signal.

Embodiment 35. The method of any one of embodiments 31-34, further comprising placing the fetal sensor in contact with the skin of the subject in proximity to the subject's uterus.

Embodiment 36. The method of any one of embodiments 31-35, further comprising placing the fetal sensor in contact with the skin of the subject in proximity to the subject's uterine horns.

Embodiment 37. The method of any one of embodiments 31-36, further comprising placing the fetal sensor in contact with the skin of the subject in proximity to the subject's back.

Embodiment 38. The method of any one of embodiments 31-37, further comprising placing the fetal sensor in contact with the skin of the subject at the subject's right lower back as viewed from the subject's rear.

Embodiment 39. The method of any one of embodiments 31-38, wherein the transmitter is configured to transmit the electromagnetic waves through at least 10 cm of body tissue, and the fetal sensor is configured to detect signals that have passed through at least 10 cm of the body tissue.

Embodiment 40. The method of any one of embodiments 31-39, wherein the transmitter is configured to transmit the electromagnetic waves to a surface of the heart of the fetus.

Embodiment 41. The method of any one of embodiments 31-40, wherein the fetal sensor is configured to detect signals reflected from the heart of the fetus using Doppler radar.

Embodiment 42. The method of any one of embodiments 31-41, wherein the fetal sensor is not configured to detect signals reflected from the heart of the fetus using ultra-wideband (UWB) radar.

Embodiment 43. The method of any one of embodiments 31-42, wherein the fetal sensor is configured to detect signals reflected from the heart of the fetus within 30 days of gestation.

Embodiment 44. The method of any one of embodiments 31-42, wherein the fetal sensor is configured to detect signals reflected from the heart of the fetus within 40 days of gestation.

Embodiment 45. The method of any one of embodiments 31-44, wherein the signals reflected from the heart of the fetus are indicative of a heartbeat of the fetus.

Embodiment 46. The method of any one of embodiments 31-45, wherein the signals reflected from the heart of the fetus are indicative of a heart rate of the fetus.

Embodiment 47. The method of any one of embodiments 31-46, wherein the fetal sensor is embedded in a fabric.

Embodiment 48. The method of any one of embodiments 31-47, wherein the fetal sensor is embedded in a strap.

Embodiment 49. The method of any one of embodiments 31-48, wherein the transmitter and the fetal sensor are in a common housing.

Embodiment 50. The method of any one of embodiments 31-49, further comprising transmitting through skin of the subject by the transmitter electromagnetic waves to a heart of the subject.

Embodiment 51. The method of embodiment 50, wherein the transmitter is configured to transmit the electromagnetic waves to a surface of the heart of the subject.

Embodiment 52. The method of embodiment 50 or 51, further comprising detecting by a maternal sensor a signal reflected from the heart of the subject in response to the electromagnetic waves transmitted to the heart of the subject.

Embodiment 53. The method of embodiment 52, further comprising determining a heart rate of the subject based on the detected signal.

Embodiment 54. The method of embodiment 53, wherein the heart rate of the fetus is greater than the heart rate of the subject.

Embodiment 55. The method of any one of embodiments 52-54, further comprising placing the maternal sensor in contact with the skin of the subject in proximity to the subject's heart.

Embodiment 56. The method of any one of embodiments 52-55, wherein the maternal sensor is embedded in a fabric.

Embodiment 57. The method of any one of embodiments 52-56, wherein the maternal sensor is embedded in a strap.

Embodiment 58. The method of any one of embodiments 31-57, wherein the subject is a non-human animal.

Embodiment 59. The method of any one of embodiments 31-57, wherein the subject is a livestock.

Embodiment 60. The method of any one of embodiments 31-57, wherein the subject is a ruminant.

Embodiment 61. The method of any one of embodiments 31-57, wherein the subject is a bovine.

Embodiment 62. The method of any one of embodiments 31-57, wherein the subject is a dairy cow.

Embodiment 63. The method of any one of embodiments 31-57, wherein the subject is an ungulate.

Embodiment 64. The method of any one of embodiments 31-57, wherein the subject is an equine.

Embodiment 65. A method comprising: a) transmitting through a rectal wall of a subject by a transmitter electromagnetic waves to a heart of a fetus inside the subject; and b) detecting by a fetal sensor a signal reflected from the heart of the fetus in response to the electromagnetic waves transmitted to the heart of the fetus, wherein the heart of the fetus is disposed at a depth of at least 2 cm beneath the rectal wall of the subject.

Embodiment 66. The method of embodiment 65, further comprising determining a presence of the fetus in the subject based on detecting the signal.

Embodiment 67. The method of embodiment 66, wherein the presence of the fetus in the subject is based on a periodicity of the signal reflected from the heart of the fetus in response to the electromagnetic waves transmitted to the heart of the fetus.

Embodiment 68. The method of any one of embodiments 65-67, further comprising determining a heart rate of the fetus based on the detected signal.

Embodiment 69. The method of any one of embodiments 65-68, further comprising inserting the fetal sensor into the subject's rectum.

Embodiment 70. The method of any one of embodiments 65-69, wherein the transmitter is configured to transmit the electromagnetic waves through at least 2 cm of body tissue, and the fetal sensor is configured to detect signals that have passed through at least 2 cm of the body tissue.

Embodiment 71. The method of any one of embodiments 65-70, wherein the transmitter is configured to transmit the electromagnetic waves to a surface of the heart of the fetus.

Embodiment 72. The method of any one of embodiments 65-71, wherein the fetal sensor is configured to detect signals reflected from the heart of the fetus using Doppler radar.

Embodiment 73. The method of any one of embodiments 65-72, wherein the fetal sensor is not configured to detect signals reflected from the heart of the fetus using ultra-wideband (UWB) radar.

Embodiment 74. The method of any one of embodiments 65-73, wherein the fetal sensor is configured to detect signals reflected from the heart of the fetus within 30 days of gestation.

Embodiment 75. The method of any one of embodiments 65-73, wherein the fetal sensor is configured to detect signals reflected from the heart of the fetus within 40 days of gestation.

Embodiment 76. The method of any one of embodiments 65-75, wherein the signals reflected from the heart of the fetus are indicative of a heartbeat of the fetus.

Embodiment 77. The method of any one of embodiments 65-76, wherein the signals reflected from the heart of the fetus are indicative of a heart rate of the fetus.

Embodiment 78. The method of any one of embodiments 65-77, wherein the fetal sensor is embedded in a transrectal probe.

Embodiment 79. The method of any one of embodiments 65-78, wherein the transmitter and the fetal sensor are in a common housing.

Embodiment 80. The method of any one of embodiments 65-79, further comprising transmitting through skin of the subject by a maternal transmitter electromagnetic waves to a heart of the subject.

Embodiment 81. The method of embodiment 80, wherein the maternal transmitter is configured to transmit the electromagnetic waves to a surface of the heart of the subject.

Embodiment 82. The method of embodiment 80 or 81, further comprising detecting by a maternal sensor a signal reflected from the heart of the subject in response to the electromagnetic waves transmitted to the heart of the subject.

Embodiment 83. The method of embodiment 82, further comprising determining a heart rate of the subject based on the detected signal.

Embodiment 84. The method of embodiment 83, wherein the heart rate of the fetus is greater than the heart rate of the subject.

Embodiment 85. The method of any one of embodiments 82-84, further comprising placing the maternal sensor in contact with the skin of the subject in proximity to the heart of the subject.

Embodiment 86. The method of any one of embodiments 82-85, wherein the maternal sensor is embedded in a fabric.

Embodiment 87. The method of any one of embodiments 82-86, wherein the maternal sensor is embedded in a strap.

Embodiment 88. The method of any one of embodiments 65-87, wherein the subject is a non-human animal.

Embodiment 89. The method of any one of embodiments 65-87, wherein the subject is a livestock.

Embodiment 90. The method of any one of embodiments 65-87, wherein the subject is a ruminant.

Embodiment 91. The method of any one of embodiments 65-87, wherein the subject is a bovine.

Embodiment 92. The method of any one of embodiments 65-87, wherein the subject is a dairy cow.

Embodiment 93. The method of any one of embodiments 65-87, wherein the subject is an ungulate.

Embodiment 94. The method of any one of embodiments 65-87, wherein the subject is an equine.

What is claimed is:

1. A handheld pregnancy detection device comprising:
   an antenna configured for placement adjacent to hair, dermis, or combination of hair and dermis of a non-human mammalian potentially pregnant subject;
   a continuous wave (CW) Doppler radar transmitter electrically coupled to the antenna and configured to transmit electromagnetic (EM) signals via the antenna with sufficient power to penetrate between about 5 cm and about 50 cm of the dermis, muscle, bone, and body tissue of the subject to reach a heart of a fetus in the subject;
   a radar receiver electrically coupled to the antenna and configured to receive EM signals, via the antenna, reflected from the fetus and that repenetrate between the about 5 cm and the about 50 cm of the dermis, muscle, bone, and body tissue of the subject, wherein mechanical contraction and expansion of the heart of the fetus creates a doppler shift that is modulated into reflected EM signals, wherein the received reflected EM signals have a signal to noise ratio sufficiently high to tolerate user induced hand motions of the handheld device and minute motions of the fetus, the reflected EM signals comprising raw in-phase and quadrature (I/Q) data that includes periodic frequency of motion data; and
   a processor configured to:
      segment the raw in-phase and quadrature (I/Q) data into data segments;
      linearly detrend the data segments to identify I/Q data segments of interest;
      process the data segments of interest to remove low-frequency drifting, high frequency noise, and/or abrupt signal changes, and generate clean data segments;
      demodulate the clean data segments to extract motion information and produce an extracted mixture motion profile that contains maternal heart rate (MHR), maternal respiration rate (MRR), and fetal heart rate (FHR) data;
      bandpass filter and Fast Fourier transform the mixed motion profile to separate MHR and MRR data from FHR data; and
      extract the FHR data, including the periodic frequency of motion data, as an indicator of fetal heart motion of the fetus.

2. The device of claim 1, wherein the device is configured to detect objects as small as 6 mm at a depth of 17.8 cm with periodic amplitude movements as small as 0.2 mm.

3. The device of claim 1, wherein the device is configured to detect signals reflected from the fetus within 28 or fewer days of gestation.

4. The device of claim 1, wherein the processor is further configured to determine a heart rate of the fetus based on the extracted FHR data.

5. The device of claim 1, wherein the antenna is configured to be placed in external contact with the subject in proximity to a uterus of the subject.

6. The device of claim 1, wherein the antenna is configured to be placed in external contact with the subject at a rear right lower back of the subject.

7. The device of claim 1, wherein the antenna is embedded in a strap.

8. The device of claim 1, wherein the transmitter, receiver and antenna are in a common housing.

9. A method implementing a handheld pregnancy detection system comprising an antenna, a continuous wave (CW) Doppler radar transmitter electrically coupled to the antenna, and a radar receiver electrically coupled to the antenna, the method comprising:
   in response to placing the antenna adjacent to hair, dermis, or combination of hair and dermis of a non-human mammalian potentially pregnant subject:
      transmitting, using the transmitter and the antenna, electromagnetic (EM) signals through tissue of the subject with sufficient power to penetrate between about 5 cm and about 50 cm of the dermis, muscle, bone, and body tissue of the subject to reach a heart of a fetus in the subject;
      receiving, using the receiver and the antenna, EM signals reflected from the fetus in response to the transmitted electromagnetic waves EM signals and that repenetrate between the about 5 cm and the about 50 cm of the dermis, muscle, bone, and body tissue of the subject, wherein mechanical contraction and expansion of the heart of the fetus creates a doppler shift that is modulated into reflected EM signals, wherein the received reflected EM signals have a signal to noise ratio sufficiently high to tolerate user induced hand motions of the handheld system and minute motions of the fetus, the reflected EM signals comprising raw in-phase and quadrature (I/Q) data that includes periodic frequency of motion data;
      segmenting the raw in-phase and quadrature (I/Q) data into data segments;
      linearly detrending the data segments to identify I/Q data segments of interest;
      processing the data segments of interest to remove low-frequency drifting, high frequency noise, and/or abrupt signal changes, and generate clean data segments;
      demodulating the clean data segments to extract motion information and produce an extracted mixture motion profile that contains maternal heart rate (MHR), maternal respiration rate (MRR), and fetal heart rate (FHR) data;
      bandpass filtering the mixed motion profile and transforming the mixed motion profile with a Fast Fourier transform to separate MHR and MRR data from FHR data; and
      extracting the FHR data, including the periodic frequency of motion data, as an indicator of fetal heart motion of the fetus.

10. The method of claim 9, further comprising determining a presence of the fetus in the pregnant subject based on the extracted FHR data.

11. The method of claim 9, further comprising determining a heart rate of the fetus based on the extracted FHR data.

12. The method of claim 9, further comprising placing the antenna in external contact with the subject in proximity to a uterus of the subject.

13. The method of claim 9, further comprising placing the antenna in external contact with the subject at a rear right lower back of the subject.

14. The method of claim 9, wherein the transmitter is configured to transmit the electromagnetic waves through at least 10 cm of body tissue, and the receiver is configured to receive signals that have passed through at least 10 cm of the body tissue.

15. The method of claim 9, wherein the transmitter is configured to transmit the electromagnetic waves to a surface of the fetus' heart.

16. The method of claim 9, wherein the device is configured to detect signals reflected from the fetus' heart within 28 or fewer days of gestation.

17. The device of claim 1, wherein said processor is configured to determine both MHR and FHR.

18. The method of claim 9, further comprising determining both MHR and FHR.

\* \* \* \* \*